US012628243B2

(12) United States Patent
Zhang et al.

(10) Patent No.: US 12,628,243 B2
(45) Date of Patent: May 12, 2026

(54) FLIGHT AREA MANAGEMENT METHOD FOR UNCREWED AERIAL VEHICLE AND RELATED APPARATUS

(71) Applicant: Huawei Technologies Co., Ltd., Shenzhen (CN)

(72) Inventors: Chengchen Zhang, Shanghai (CN); Lin Shu, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 491 days.

(21) Appl. No.: 17/708,803

(22) Filed: Mar. 30, 2022

(65) Prior Publication Data

US 2022/0225471 A1 Jul. 14, 2022

Related U.S. Application Data

(63) Continuation of application No. PCT/CN2020/118868, filed on Sep. 29, 2020.

(30) Foreign Application Priority Data

Sep. 30, 2019 (CN) .......................... 201910962176.8

(51) Int. Cl.
H04W 76/30 (2018.01)
H04W 4/42 (2018.01)
H04W 76/10 (2018.01)
(52) U.S. Cl.
CPC ............. *H04W 76/30* (2018.02); *H04W 4/42* (2018.02); *H04W 76/10* (2018.02); *B64U 2201/00* (2023.01); *B64U 2201/10* (2023.01)
(58) Field of Classification Search
CPC ....... H04W 76/30; H04W 4/42; H04W 76/10; H04W 4/44; H04W 4/021; H04W 4/12;
(Continued)

(56) References Cited

U.S. PATENT DOCUMENTS

2015/0336014 A1* 11/2015 Stenzler ................ G01J 1/0295
472/137
2018/0040249 A1 2/2018 Kuhara
(Continued)

FOREIGN PATENT DOCUMENTS

CN 105261189 A 1/2016
CN 105472558 A 4/2016
(Continued)

OTHER PUBLICATIONS

3GPP, "3rd Generation Partnership Project; Technical Specification Group Service and System Aspects; Remote Identification of Unmanned Aerial System; Stage 1 (Release 16)", (May 2018) (From Applicant's IDS) (Year: 2018).*
(Continued)

*Primary Examiner* — Mang Hang Yeung
(74) *Attorney, Agent, or Firm* — Conley Rose, P.C.

(57) ABSTRACT

A flight area management method for an uncrewed aerial vehicle and a related apparatus, where the method includes: An access and mobility management function (AMF) obtains flight area exception information of an uncrewed aerial vehicle, where the flight area exception information indicates that the uncrewed aerial vehicle is not located in a normal flight area. The AMF sends a flight area exception notification message to an uncrewed aerial system traffic management (UTM), where the flight area exception notification message is used to indicate that the uncrewed aerial vehicle is not located in the normal flight area. When flight area exception occurs on the uncrewed aerial vehicle, using the UTM to control the uncrewed aerial vehicle can improve controlling safety for the uncrewed aerial vehicle.

20 Claims, 27 Drawing Sheets

(58) Field of Classification Search
CPC ... H04W 4/60; B64C 39/024; B64U 2201/00;
G08G 5/0013; G08G 5/0026; G08G
5/0052; G08G 5/006; G08G 5/0069
USPC .......................................................... 370/328
See application file for complete search history.

(56) References Cited

U.S. PATENT DOCUMENTS

| | | | | |
|---|---|---|---|---|
| 2019/0139421 | A1* | 5/2019 | Nilsson | ................ G08G 5/0013 |
| 2021/0329460 | A1* | 10/2021 | Liao | ...................... H04W 12/37 |
| 2022/0058958 | A1 | 2/2022 | Hong | |
| 2022/0085871 | A1 | 3/2022 | Hong | |
| 2022/0279355 | A1* | 9/2022 | Roy | ...................... H04W 12/50 |

FOREIGN PATENT DOCUMENTS

| | | |
|---|---|---|
| CN | 106448271 A | 2/2017 |
| CN | 106656307 A | 5/2017 |
| CN | 109302428 A | 2/2019 |
| CN | 109716418 A | 5/2019 |
| CN | 109792794 A | 5/2019 |
| WO | 2018144761 A1 | 8/2018 |
| WO | 2018178752 A1 | 10/2018 |
| WO | 2019030425 A1 | 2/2019 |

OTHER PUBLICATIONS

3GPP TR 22.829 V0.0.0, Nov. 2018, "3rd Generation Partnership Project; Technical Specification Group Services and System Aspects; Enhancement for Unmanned Aerial Vehicles; Stage 1 (Release 17)," 42 Pages.

3GPP TR 22.8de V0.1.0, May 2018, "3rd Generation Partnership Project; Technical Specification Group Services and System Aspects; Remote Identification of Unmanned Aerial Systems; Stage 1 (Release 16)," 12 Pages.

\* cited by examiner

FLIGHT AREA MANAGEMENT METHOD FOR UNCREWED AERIAL VEHICLE AND RELATED APPARATUS

CROSS-REFERENCE TO RELATED APPLICATIONS

This is a continuation of International Patent Application No. PCT/CN2020/118868, filed on Sep. 29, 2020, which claims priority to Chinese Patent Application No. 201910962176.8, filed on Sep. 30, 2019. The disclosures of the aforementioned applications are hereby incorporated by reference in their entireties.

TECHNICAL FIELD

The present disclosure relates to the field of communication technologies, and in particular, to a flight area management method for an uncrewed aerial vehicle and a related apparatus.

BACKGROUND

In recent years, uncrewed aerial vehicles are used in more application scenarios such as aerial photography in consumer application; agriculture application, forestry application, meteorology application, resource exploration, power inspection, and surveying and mapping in industrial application; and military application. The 3rd Generation Partnership Project (3GPP) has been discussing to develop standards for uncrewed aerial vehicles to access a 3GPP system. In future application scenarios, a controller of an uncrewed aerial vehicle may access the 3GPP system as well as the uncrewed aerial vehicle. The uncrewed aerial vehicle and the controller of the uncrewed aerial vehicle communicate using a network connection service provided by the 3GPP system.

An uncrewed aerial system traffic management (e.g., Unmanned Aircraft System Traffic Management (UTM)) is a 3GPP entity introduced for networking of uncrewed aerial vehicles in the 3GPP discussion. The UTM has functions such as performing authentication on an uncrewed aerial vehicle (e.g., Unmanned Aerial Vehicle (UAV)), authorizing an uncrewed aircraft system (e.g., Unmanned Aircraft System (UAS)) service, managing a UAS policy, and controlling UAV traffic. An authorized user (for example, an aerial traffic control department and a public safety agency) or the like may query information such as an identifier of the UAV, an identifier of a controller of the UAV, metadata, and a flight status via the UTM.

The uncrewed aerial vehicle that accesses the 3GPP system communicates with the controller of the UAV through a network connection provided by the 3GPP system. The uncrewed aerial vehicle and the controller may fail to continue communicating with each other beyond the network connection service provided by the 3GPP system. Due to particularity of the uncrewed aerial vehicle, a location of the uncrewed aerial vehicle, namely, an area in which the uncrewed aerial vehicle is allowed to fly, needs to be restricted. When the uncrewed aerial vehicle flies outside the area in which the uncrewed aerial vehicle is allowed to fly, the 3GPP system may consider the uncrewed aerial vehicle as an unauthorized uncrewed aerial vehicle. Therefore, the 3GPP system is highly likely to stop providing the network connection service for the uncrewed aerial vehicle. In other words, if the uncrewed aerial vehicle flies outside the area in which the uncrewed aerial vehicle is allowed to fly, the uncrewed aerial vehicle and the controller may fail to continue communicating with each other. This may cause the uncrewed aerial vehicle to lose control, bringing forth potential safety risks for the uncrewed aerial vehicle.

SUMMARY

Embodiments of the present disclosure provide a flight area management method for an uncrewed aerial vehicle and a related apparatus, to improve controlling safety for the uncrewed aerial vehicle using a UTM to control the uncrewed aerial vehicle when flight area exception occurs on the uncrewed aerial vehicle.

According to a first aspect, an embodiment of the present disclosure provides a flight area management method for an uncrewed aerial vehicle. The method includes:

An access and mobility management function (AMF) receives a subscription request message from an uncrewed aerial system traffic management (UTM), where the subscription request message is used to request to subscribe to a flight area change event of the uncrewed aerial vehicle.

The AMF obtains flight area exception information of the uncrewed aerial vehicle, where the flight area exception information indicates that the uncrewed aerial vehicle is not located in a normal flight area.

The AMF sends a flight area exception notification message to the UTM, where the flight area exception notification message is used to indicate that the uncrewed aerial vehicle is not located in the normal flight area.

In the foregoing embodiment, the AMF receives the subscription request information from the UTM. After obtaining the flight area exception information of the uncrewed aerial vehicle, the AMF sends the flight area exception notification message to the UTM, such that the AMF may notify the UTM in a timely manner that the uncrewed aerial vehicle is not located in the normal flight area after obtaining the flight area exception of the uncrewed aerial vehicle. In this way, the UTM may control the uncrewed aerial vehicle, thereby improving controlling safety for the uncrewed aerial vehicle.

With reference to the first aspect, in a possible embodiment of the first aspect, the method further includes the following.

The AMF sends the flight area exception notification message of the uncrewed aerial vehicle to a session management function SMF, where the flight area exception notification message of the uncrewed aerial vehicle is used to notify that the uncrewed aerial vehicle is not located in the normal flight area and indicate the SMF to determine the UTM as a controller of the uncrewed aerial vehicle in a context of a session corresponding to both the uncrewed aerial vehicle and the controller of the uncrewed aerial vehicle.

In this example, after determining that the uncrewed aerial vehicle is not located in the normal flight area, the AMF sends the flight area exception notification message of the uncrewed aerial vehicle to the SMF, to indicate the SMF to change the controller of the uncrewed aerial vehicle in the context of the session to the UTM, such that the UTM controls the uncrewed aerial vehicle. This improves controlling safety for the uncrewed aerial vehicle when the uncrewed aerial vehicle is not located in the normal flight area.

With reference to the first aspect, in a possible embodiment of the first aspect, the method further includes the following.

The AMF sends a controller switching notification message to the uncrewed aerial vehicle, where the controller switching notification message is used to indicate that the UTM is determined as the controller of the uncrewed aerial vehicle.

In this example, the AMF directly sends the controller switching notification message to the uncrewed aerial vehicle, to indicate the uncrewed aerial vehicle to determine the UTM as the controller of the uncrewed aerial vehicle, such that the UTM may be used to control the uncrewed aerial vehicle that is not located in the normal flight area. This improves controlling safety for the uncrewed aerial vehicle.

According to a second aspect, an embodiment of the present disclosure provides a flight area management method for an uncrewed aerial vehicle. The method includes the following.

A UTM sends a subscription request message to an AMF, where the subscription request message is used to request to subscribe to a flight area change event of the uncrewed aerial vehicle.

The UTM receives a flight area exception notification message, where the flight area exception notification message is used to indicate that the uncrewed aerial vehicle is not located in a normal flight area.

The UTM sends a first controller switching notification message, where the first controller switching notification message includes first control indication information, and where the first control indication information is used to indicate a controller of the uncrewed aerial vehicle to stop controlling the uncrewed aerial vehicle.

The UTM sends a second controller switching notification message, where the second controller switching notification message includes second control indication information, and where the second control indication information is used to indicate that the UTM is determined as the controller of the uncrewed aerial vehicle.

In the foregoing embodiment, the UTM subscribes to the flight area change event of the uncrewed aerial vehicle from the AMF. When the uncrewed aerial vehicle is not located in the normal flight area, the UTM sends the first controller switching notification message to indicate the controller of the uncrewed aerial vehicle to stop controlling the uncrewed aerial vehicle, and sends the second controller switching notification message to switch the controller of the uncrewed aerial vehicle to the UTM. Compared with an existing solution in which the controller of the uncrewed aerial vehicle cannot control the uncrewed aerial vehicle when the uncrewed aerial vehicle is not located in the normal flight area, this solution in the present disclosure uses the UTM to control the uncrewed aerial vehicle, thereby improving controlling safety for the uncrewed aerial vehicle.

With reference to the second aspect, in a possible embodiment of the second aspect, that the UTM sends a first controller switching notification message includes the following.

The UTM sends the first controller switching notification message to a policy control function (PCF), a session management function (SMF), or the controller of the uncrewed aerial vehicle.

With reference to the second aspect, in a possible embodiment of the second aspect, that the UTM sends a second controller switching notification message includes the following.

The UTM sends the second controller switching notification message to the uncrewed aerial vehicle.

With reference to the second aspect, in a possible embodiment of the second aspect, the second control indication information is used to indicate that the UTM is determined as the controller of the uncrewed aerial vehicle in session policy information corresponding to both the uncrewed aerial vehicle and the controller of the uncrewed aerial vehicle.

In this example, the indication information is used to indicate that the UTM is determined as the controller of the uncrewed aerial vehicle in the session policy information. Directly modifying the session policy information can implement quick controlling for the uncrewed aerial vehicle by the UTM, thereby improving controlling efficiency for the uncrewed aerial vehicle by the UTM.

With reference to the second aspect, in a possible embodiment of the second aspect, the second control indication information is used to indicate that the UTM is determined as the controller of the uncrewed aerial vehicle in a context of a session corresponding to the uncrewed aerial vehicle and the controller of the uncrewed aerial vehicle.

In this example, the indication information is used to indicate that the UTM is determined as the controller of the uncrewed aerial vehicle in the context of the session. Directly modifying the context of the session can implement quick controlling for the uncrewed aerial vehicle by the UTM, thereby improving controlling efficiency for the uncrewed aerial vehicle by the UTM.

With reference to the second aspect, in a possible embodiment of the second aspect, before the UTM sends the first controller switching notification message, the method further includes the following.

The UTM sends a notification about the uncrewed aerial vehicle leaving the normal flight area to the controller of the uncrewed aerial vehicle, where the notification about the uncrewed aerial vehicle leaving the normal flight area includes third control indication information, and where the third control indication information is used to notify that the uncrewed aerial vehicle leaves the normal flight area and indicate the controller of the uncrewed aerial vehicle to control the uncrewed aerial vehicle to enter the normal flight area.

In this example, when the uncrewed aerial vehicle is not located in the normal flight area, the notification about the uncrewed aerial vehicle leaving the normal flight area is sent to the controller of the uncrewed aerial vehicle, and the third control indication information is used to indicate the controller of the uncrewed aerial vehicle to control the uncrewed aerial vehicle to enter the normal flight area. Therefore, the uncrewed aerial vehicle may be controlled by indicating the controller of the uncrewed aerial vehicle to control the uncrewed aerial vehicle to enter the normal flight area, without requiring modification on the controller of the uncrewed aerial vehicle. This improves controlling efficiency for the uncrewed aerial vehicle.

Optionally, that the UTM sends a first controller switching notification message includes the following.

The UTM starts a timer.

The UTM sends the first controller switching notification message if the UTM does not receive a notification message sent by the AMF after the timer expires, where the notification message is used to notify the UTM that the uncrewed aerial vehicle has entered the normal flight area.

In this example, the timer is started. If the notification message sent by the AMF is not received after the timer expires, the first controller switching notification message is sent. Determining whether to send the controller switching notification message in a timing manner can improve controlling flexibility for the uncrewed aerial vehicle.

With reference to the second aspect, in a possible embodiment of the second aspect, the control indication information included in the first controller switching message is used to indicate to release a session between the uncrewed aerial vehicle and the controller of the uncrewed aerial vehicle, such that the controller of the uncrewed aerial vehicle stops controlling the uncrewed aerial vehicle.

In this example, the session between the uncrewed aerial vehicle and the controller of the uncrewed aerial vehicle is indicated to be released, such that the controller of the uncrewed aerial vehicle stops controlling the uncrewed aerial vehicle. Stopping controlling the uncrewed aerial vehicle by the controller of the uncrewed aerial vehicle by directly releasing the session can improve efficiency for stopping controlling the uncrewed aerial vehicle by the controller of the uncrewed aerial vehicle.

With reference to the second aspect, in a possible embodiment of the second aspect, the method further includes the following.

The UTM receives a controller switching request sent by the uncrewed aerial vehicle.

The UTM sends a controller switching response to the uncrewed aerial vehicle, where the controller switching response is used to indicate that the UTM accepts a control request from the uncrewed aerial vehicle.

According to a third aspect, an embodiment of this application provides a flight area management method for an uncrewed aerial vehicle. The method includes the following.

When the uncrewed aerial vehicle is not located in a normal flight area, a controller of the uncrewed aerial vehicle obtains control indication information of the uncrewed aerial vehicle, where the control indication information is used to indicate the controller of the uncrewed aerial vehicle to stop controlling the uncrewed aerial vehicle or to control the uncrewed aerial vehicle to enter the normal flight area.

The controller of the uncrewed aerial vehicle performs an operation indicated by the control indication information on the uncrewed aerial vehicle.

With reference to the third aspect, in a possible embodiment of the third aspect, if the control indication information is used to indicate the controller of the uncrewed aerial vehicle to stop controlling the uncrewed aerial vehicle, that a controller of the uncrewed aerial vehicle obtains control indication information of the uncrewed aerial vehicle includes:

The controller of the uncrewed aerial vehicle obtains the control indication information from a first controller switching notification message received from a UTM.

With reference to the third aspect, in a possible embodiment of the third aspect, the method further includes the following.

The controller of the uncrewed aerial vehicle sends a session release request to a session management function SMF, where the session release request is used to request the SMF to release a session between the controller of the uncrewed aerial vehicle and the uncrewed aerial vehicle.

The controller of the uncrewed aerial vehicle receives a session release response.

In this example, the session between the controller of the uncrewed aerial vehicle and the uncrewed aerial vehicle is released. The controller of the uncrewed aerial vehicle stops controlling the uncrewed aerial vehicle by directly releasing the session, thereby improving efficiency for stopping controlling the uncrewed aerial vehicle by the controller of the uncrewed aerial vehicle.

With reference to the third aspect, in a possible embodiment of the third aspect, if the control indication information is used to indicate the controller of the uncrewed aerial vehicle to stop controlling the uncrewed aerial vehicle, that a controller of the uncrewed aerial vehicle obtains control indication information of the uncrewed aerial vehicle includes:

The controller of the uncrewed aerial vehicle obtains the control indication information from a received session modification command or a received session release command, where the session modification command or the session release command is sent by an SMF.

With reference to the third aspect, in a possible embodiment of the third aspect, if the control indication information is used to indicate the controller of the uncrewed aerial vehicle to control the uncrewed aerial vehicle to enter the normal flight area, that a controller of the uncrewed aerial vehicle obtains control indication information of the uncrewed aerial vehicle includes:

The controller of the uncrewed aerial vehicle obtains the control indication information from a notification about the uncrewed aerial vehicle leaving the normal flight area that is received from the UTM.

Optionally, the control indication information further includes a time period, and that the controller of the uncrewed aerial vehicle performs an operation indicated by the control indication information on the uncrewed aerial vehicle includes:

The controller of the uncrewed aerial vehicle controls, within the time period, the uncrewed aerial vehicle to enter the normal flight area.

According to a fourth aspect, an embodiment of this application provides a network device. The device includes: a receiving unit configured to receive a subscription request message from a UTM, where the subscription request message is used to request to subscribe to a flight area change event of an uncrewed aerial vehicle; an obtaining unit configured to obtain flight area exception information of the uncrewed aerial vehicle, where the flight area exception information indicates that the uncrewed aerial vehicle is not located in a normal flight area; and a sending unit configured to send a flight area exception notification message to the UTM, where the flight area exception notification message is used to indicate that the uncrewed aerial vehicle is not located in the normal flight area.

With reference to the fourth aspect, in a possible embodiment of the fourth aspect, the sending unit is further configured to: send the flight area exception notification message of the uncrewed aerial vehicle to a session management function SMF, where the flight area exception notification message of the uncrewed aerial vehicle is used to notify that the uncrewed aerial vehicle is not located in the normal flight area and indicate the SMF to determine the UTM as a controller of the uncrewed aerial vehicle in a context of a session corresponding to both the uncrewed aerial vehicle and the controller of the uncrewed aerial vehicle.

With reference to the fourth aspect, in a possible embodiment of the fourth aspect, the sending unit is further configured to: send a controller switching notification message to the uncrewed aerial vehicle, where the controller switching notification message is used to indicate that the UTM is determined as the controller of the uncrewed aerial vehicle.

According to a fifth aspect, an embodiment of this application provides a network device. The device includes: a sending unit configured to send a subscription request message to an AMF, where the subscription request message is used to request to subscribe to a flight area change event of an uncrewed aerial vehicle; and a receiving unit configured to receive a flight area exception notification message, where the flight area exception notification message is used to indicate that the uncrewed aerial vehicle is not located in a normal flight area.

The sending unit is configured to send a first controller switching notification message, where the first controller switching notification message includes first control indication information, and where the first control indication information is used to indicate a controller of the uncrewed aerial vehicle to stop controlling the uncrewed aerial vehicle.

The sending unit is configured to send a second controller switching notification message, where the second controller switching notification message includes second control indication information, and where the second control indication information is used to indicate that a UTM is determined as the controller of the uncrewed aerial vehicle.

With reference to the fifth aspect, in a possible embodiment of the fifth aspect, the sending unit is configured to: send the first controller switching notification message to a PCF, an SMF, or the controller of the uncrewed aerial vehicle.

With reference to the fifth aspect, in a possible embodiment of the fifth aspect, the sending unit is configured to: send the second controller switching notification message to the uncrewed aerial vehicle.

With reference to the fifth aspect, in a possible embodiment of the fifth aspect, the second control indication information is used to indicate that the UTM is determined as the controller of the uncrewed aerial vehicle in session policy information corresponding to both the uncrewed aerial vehicle and the controller of the uncrewed aerial vehicle.

With reference to the fifth aspect, in a possible embodiment of the fifth aspect, the second control indication information is used to indicate that the UTM is determined as the controller of the uncrewed aerial vehicle in a context of a session corresponding to both the uncrewed aerial vehicle and the controller of the uncrewed aerial vehicle.

With reference to the fifth aspect, in a possible embodiment of the fifth aspect, before sending the first controller switching notification message, the sending unit is further configured to: send, by the UTM, a notification about the uncrewed aerial vehicle leaving the normal flight area to the controller of the uncrewed aerial vehicle, where the notification about the uncrewed aerial vehicle leaving the normal flight area includes control indication information, and where the control indication information is used to indicate that the uncrewed aerial vehicle leaves the normal flight area and indicate the controller of the uncrewed aerial vehicle to control the uncrewed aerial vehicle to enter the normal flight area.

Optionally, before sending the first controller switching notification message, the sending unit is configured to: start a timer; and after the timer expires, send, by the sending unit, the first controller switching notification message if a notification message sent by the AMF is not received, where the notification message is used to notify the UTM that the uncrewed aerial vehicle has entered the normal flight area.

With reference to the fifth aspect, in a possible embodiment of the fifth aspect, the control indication information included in the first controller switching message is used to indicate to release the session between the uncrewed aerial vehicle and the controller of the uncrewed aerial vehicle, such that the controller of the uncrewed aerial vehicle stops controlling the uncrewed aerial vehicle.

With reference to the fifth aspect, in a possible embodiment of the fifth aspect, the receiving unit is configured to receive a controller switching request sent by the uncrewed aerial vehicle.

The sending unit is configured to send a controller switching response to the uncrewed aerial vehicle, where the controller switching response is used to indicate that the UTM accepts a control request from the uncrewed aerial vehicle.

According to a sixth aspect, an embodiment of this application provides a terminal device. The device includes: an obtaining unit configured to obtain control indication information of an uncrewed aerial vehicle when the uncrewed aerial vehicle is not located in a normal flight area, where the control indication information is used to indicate the terminal device to stop controlling the uncrewed aerial vehicle or to control the uncrewed aerial vehicle to enter the normal flight area; and an execution unit configured to perform an operation indicated by the control indication information on the uncrewed aerial vehicle.

With reference to the sixth aspect, in a possible embodiment of the sixth aspect, if the control indication information is used to indicate the terminal device to stop controlling the uncrewed aerial vehicle, the obtaining unit is configured to: obtain the control indication information from a first controller switching notification message received from a UTM.

With reference to the sixth aspect, in a possible embodiment of the sixth aspect, the terminal device further includes a sending unit and a receiving unit.

The sending unit is configured to send a session release request to a session management function SMF to request the SMF to release a session between the terminal device and the uncrewed aerial vehicle.

The receiving unit is configured to receive a session release response.

With reference to the sixth aspect, in a possible embodiment of the sixth aspect, if the control indication information is used to indicate the terminal device to stop controlling the uncrewed aerial vehicle, the obtaining unit is configured to: obtain the control indication information from a received session modification command or a received session release command, where the session modification command or the session release command is sent by an SMF.

With reference to the sixth aspect, in a possible embodiment of the sixth aspect, if the control indication information is used to indicate the terminal device to control the uncrewed aerial vehicle to enter the normal flight area, the obtaining unit is configured to: obtain the control indication information from a notification about the uncrewed aerial vehicle leaving the normal flight area that is received from the UTM.

Optionally, the control indication information further includes a time period, and the execution unit includes: controlling, within the time period, the uncrewed aerial vehicle to enter the normal flight area.

According to a seventh aspect, an embodiment of this application provides a communication system. The communication system includes the network device according to the fourth aspect, the network device according to the fifth aspect, and the terminal device according to the sixth aspect.

According to an eighth aspect, an embodiment of this application provides a computer storage medium. The computer storage medium stores a computer program, and the computer program includes program instructions. When the program instructions are executed by a processor, the processor is enabled to perform all or a part of the methods according to the first aspect, the second aspect, and the third aspect.

According to a ninth aspect, an embodiment of this application provides a computer program product. The computer program product includes a non-transitory computer-readable storage medium that stores a computer program. The computer program may be operated to enable a computer to perform all or a part of the steps described in the first aspect, the second aspect, and the third aspect of embodiments of this application. The computer program product may be a software installation package.

According to a tenth aspect, an embodiment of this application provides a chip system. The chip system includes a processor configured to support a network device in implementing all or a part of the methods according to the first aspect.

According to an eleventh aspect, an embodiment of this application provides a chip system. The chip system includes a processor configured to support a network device in implementing all or a part of the methods according to the second aspect.

According to a twelfth aspect, an embodiment of this application provides a chip system. The chip system includes a processor configured to support a terminal device in implementing all or a part of the methods according to the third aspect.

These aspects or other aspects of the present disclosure are clearer and more comprehensible in description of the following embodiments.

BRIEF DESCRIPTION OF DRAWINGS

To describe the technical solutions in embodiments of the present disclosure or in other approaches more clearly, the following briefly describes the accompanying drawings for describing embodiments or other approaches. It is clear that the accompanying drawings in the following description show merely some embodiments of the present disclosure, and a person of ordinary skill in the art may derive other drawings from these accompanying drawings without creative efforts.

DESCRIPTION OF EMBODIMENTS

The following describes embodiments of this application with reference to the accompanying drawings.

Embodiments of this application are intended to resolve the following problem in an existing solution: Because an uncrewed aerial vehicle and a controller may fail to continue communicating with each other when the uncrewed aerial vehicle flies outside a normal flight area, the uncrewed aerial vehicle may be prone to lose control, causing relatively low controlling safety for the uncrewed aerial vehicle. In embodiments of this application, when it is obtained that the uncrewed aerial vehicle is not located in the normal flight area, a UTM is used to control the uncrewed aerial vehicle by switching the controller of the uncrewed aerial vehicle to the UTM, to improve controlling safety for the uncrewed aerial vehicle.

The following abbreviations are used in embodiments of this application: PCF, UTM, AMF, SMF, UPF, DN, NEF, UAV, and UAS. PCF: policy control function. UTM: Unmanned Aircraft System Traffic Management (or uncrewed aerial system traffic management). AMF: access and mobility management function. SMF: session management function. UPF: user plane function. DN: data network. NEF: network exposure function. UAV: Unmanned Aerial Vehicle (or uncrewed aerial vehicle). UAS: Unmanned Aircraft System (or uncrewed aircraft system).

The UTM involved in this application may be a new network element, or may be an existing network element that has a UTM function. This is not specifically limited in this application.

Figure 1:
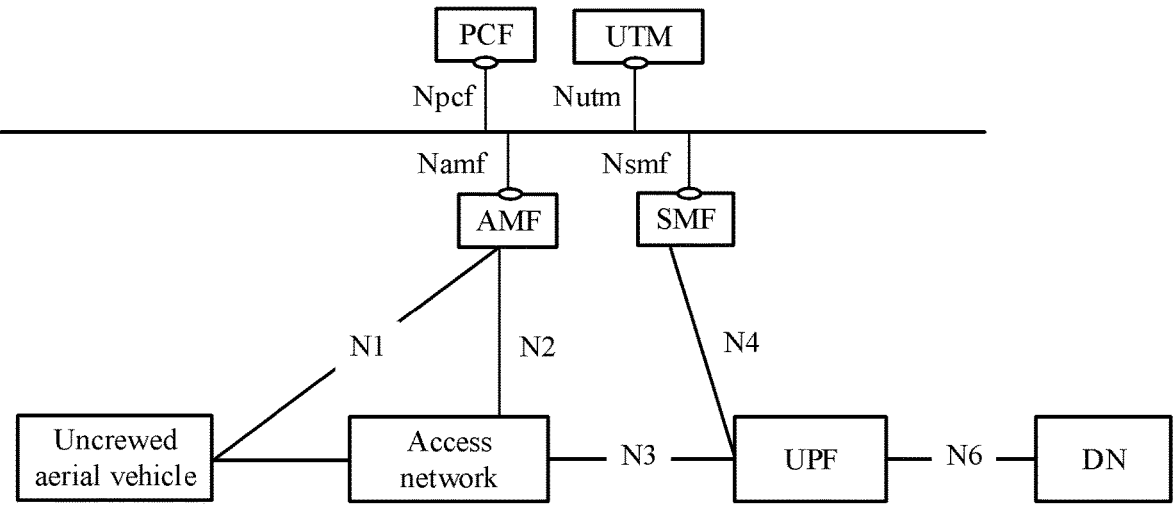
FIG. 1 is a schematic diagram of an architecture of a 5th generation (5G) system according to an embodiment of this application.

For a better understanding of a flight area management method for an uncrewed aerial vehicle provided in embodiments of this application, the following first briefly describes a 5G system to which the flight area management method for an uncrewed aerial vehicle is applied. FIG. 1 is a schematic diagram of an architecture of a 5G system according to an embodiment of this application. As shown in FIG. 1, the 5G system includes an uncrewed aerial vehicle, an AMF, an SMF, a PCF, and a UTM. The UTM may subscribe to a flight area change event of the uncrewed aerial vehicle from the AMF. Alternatively, a flight area change event of the uncrewed aerial vehicle may be configured in advance in the AMF. The AMF may obtain location information of the uncrewed aerial vehicle from an access network through an interface N2. When the AMF determines, based on the location information, that the uncrewed aerial vehicle is not located in a normal flight area, the AMF sends a flight area exception notification message to the UTM. After receiving the flight area exception notification message, the UTM sends a first controller switching notification message and a second controller switching notification message, where first control indication information included in the first controller switching notification message is used to indicate a controller of the uncrewed aerial vehicle to stop controlling the uncrewed aerial vehicle, and where second control indication information included in the second controller switching notification message is used to indicate to determine the UTM as the controller of the uncrewed aerial vehicle. After obtaining a control indication message, the controller of the uncrewed aerial vehicle performs an operation indicated by the controller indication message, where the controller indication message obtained by the uncrewed aerial vehicle may be a first controller indication message. The first controller switching notification message may be sent to the uncrewed aerial vehicle, the PCF, or the SMF; and the second controller switching notification message may be sent to the controller of the uncrewed aerial vehicle, the PCF, or the SMF, to complete determining the UTM as the controller of the uncrewed aerial vehicle, such that the UTM controls the uncrewed aerial vehicle. Compared with the existing solution in which the controller of the uncrewed aerial vehicle cannot control the uncrewed aerial vehicle when the uncrewed aerial vehicle is not located in the normal flight area, the solution in the present disclosure uses the UTM to control the uncrewed aerial vehicle, thereby improving controlling safety for the uncrewed aerial vehicle.

The normal flight area may be understood as a specific area that is allocated by a mobile network operator, which is not a restricted area, where an area beyond boundaries of the normal flight area may be a restricted area or another special area in which flying is prohibited. The area herein may be an individual area, or may be an area formed by a plurality of areas. The normal flight area may be a combination of a tracking area (TA) and an altitude range, a combination of a latitude and a longitude range and an altitude range, or another possible combination of a horizontal range and a vertical range. The normal flight area may be regular or irregular. This is not limited in this application.

Alternatively, the normal flight area is a proper subset of an allowable flight area of an uncrewed aerial vehicle. The allowable flight area of an uncrewed aerial vehicle may be a combination of a horizontal range and a vertical range. For example, the UAV is allowed to fly only in a geographic area whose height falls between a lower limit and an upper limit. Granularities of the horizontal range and the vertical range of the allowable flight area herein are not limited. The granularity of the horizontal range may be an existing tracking area, a cell range, a registration area, or the like, or may be a longitude, a latitude, or the like having a smaller granularity.

This application is mainly applied to a scenario in which an uncrewed aerial vehicle is controlled to enter the normal flight area when the uncrewed aerial vehicle flies outside the normal flight area but is still located in the allowable flight area of the uncrewed aerial vehicle. If the uncrewed aerial vehicle flies outside the uncrewed aerial vehicle allowed flight area, the uncrewed aerial vehicle may fail to communicate with the uncrewed aerial vehicle, and therefore the uncrewed aerial vehicle may lose control.

It should be noted that the flight area exception notification message in embodiments of this application may also be referred to as a subscription request response message.

Figure 2A:
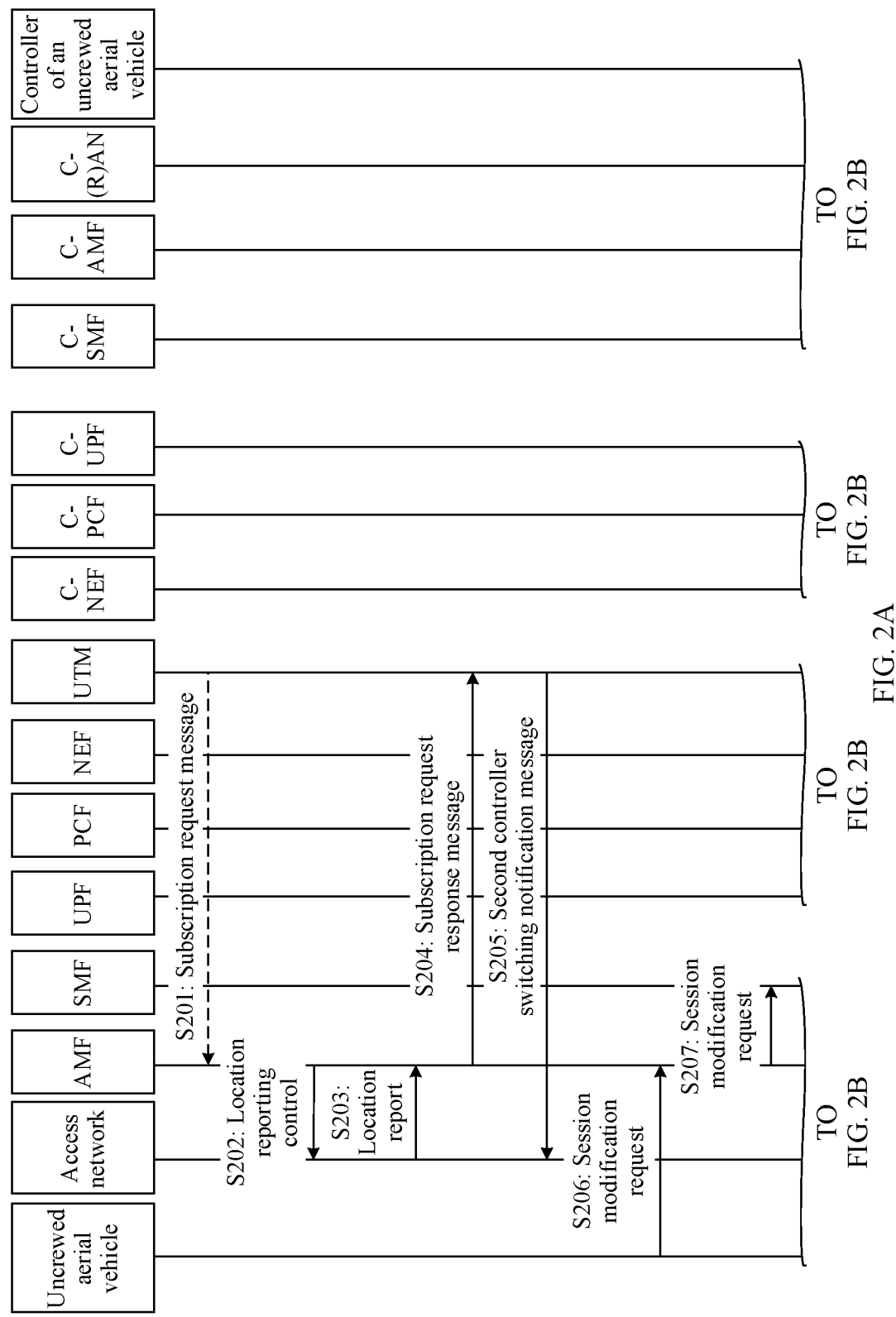
FIG. 2A to FIG. 2C are a schematic interaction diagram of a flight area management method for an uncrewed aerial vehicle according to an embodiment of this application.
Figure 2B:
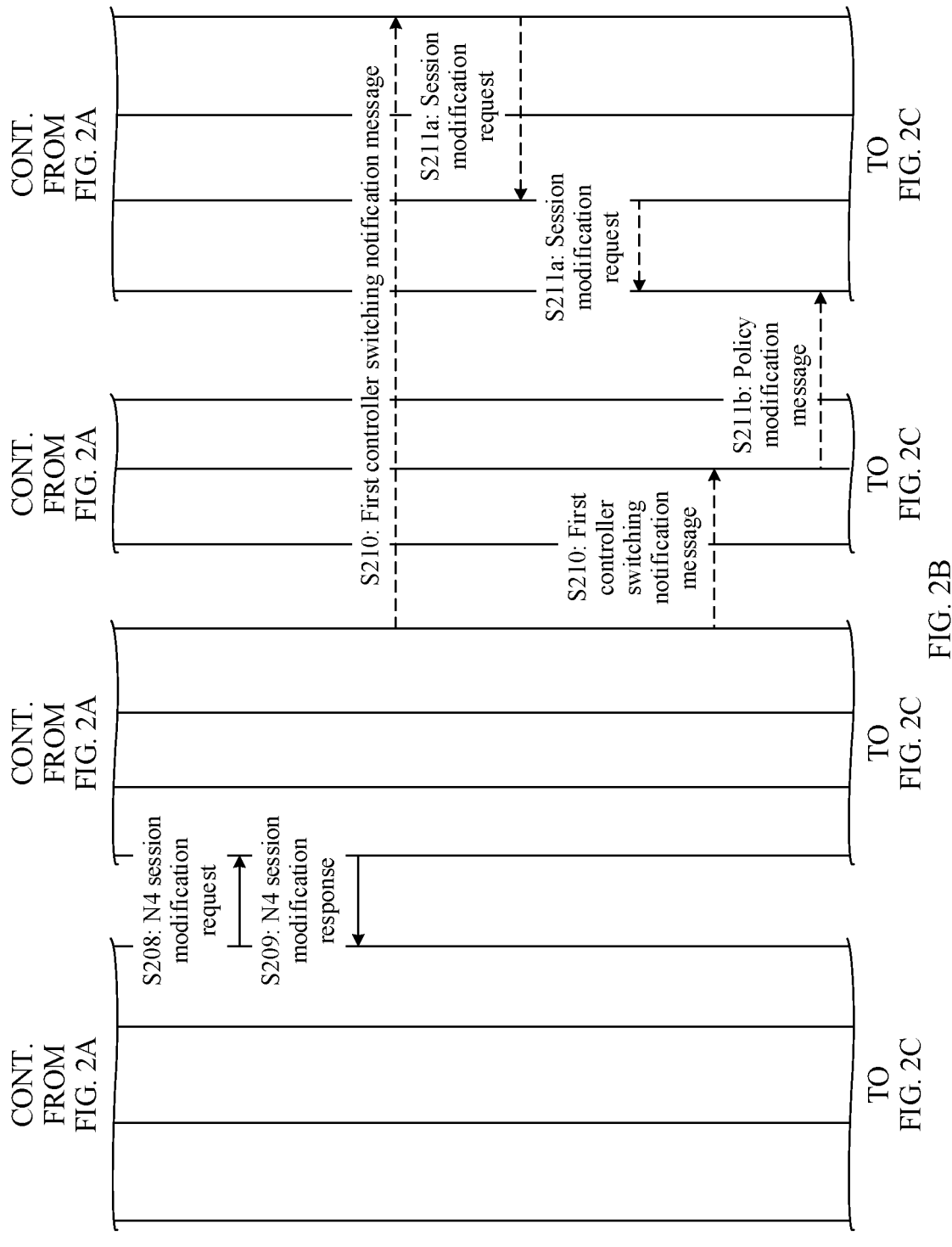
Figure 2C:
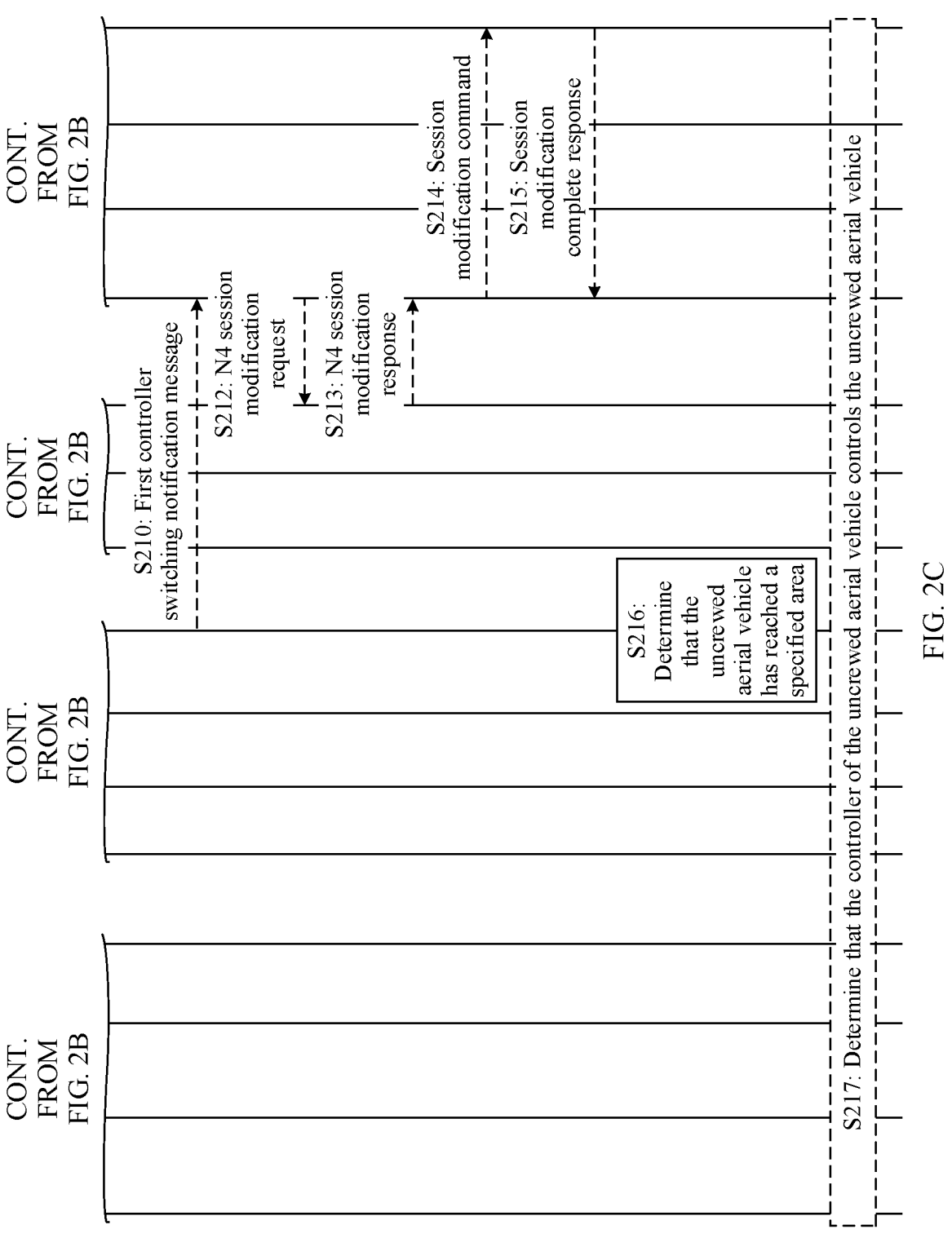

FIG. 2A to FIG. 2C are a schematic interaction diagram of a flight area management method for an uncrewed aerial vehicle according to an embodiment of this application. As shown in FIG. 2A to FIG. 2C, the flight area management method includes steps S201 to S218. The steps are as follows.

S201: A UTM sends a subscription request message to an AMF.

The subscription request message is used to request to subscribe to a flight area change event of the uncrewed aerial vehicle. The flight area change event may be understood as whether the uncrewed aerial vehicle is located in a normal flight area. When a flight area of the uncrewed aerial vehicle changes, the AMF needs to report to the UTM that the uncrewed aerial vehicle is not located in the normal flight area.

Optionally, the flight area change event may alternatively be understood as whether the uncrewed aerial vehicle is located in an abnormal flight area, where the abnormal flight area is a complementary set of the normal flight area, that is, the abnormal flight area may be understood as an area other than the normal flight area. When the flight area change event is whether the uncrewed aerial vehicle is located in the abnormal flight area, an implementation is the same as an implementation in which the flight area change event is whether the uncrewed aerial vehicle is located in the normal flight area. In embodiments of this application, an example in which the flight area change event is whether the uncrewed aerial vehicle is located in the normal flight area is used for description.

The subscription request message may include identification information of the uncrewed aerial vehicle and the normal flight area of the uncrewed aerial vehicle. Different uncrewed aerial vehicles may have different normal flight areas, or may have a same normal flight area. This is not specifically limited in this application. The normal flight area may be from subscription data obtained when the uncrewed aerial vehicle is registered. The identification information of the uncrewed aerial vehicle is information that may uniquely identify the uncrewed aerial vehicle.

The subscription request message may include identification information of one or more uncrewed aerial vehicles and one or more normal flight areas corresponding to the one or more uncrewed aerial vehicles.

Step S201 is an optional step during execution. In other words, step S201 may or may not be performed. If S201 is not performed, content in step S201 may be preconfigured, that is, the flight area change event is preconfigured in the AMF. Alternatively, the flight area change event may be configured in another manner. This is not specifically limited in this application.

S202: The AMF sends a location reporting control message to an access network.

The location reporting control is used to indicate the access network to report an event about the uncrewed aerial vehicle entering or leaving the normal flight area. That is, when the uncrewed aerial vehicle enters or leaves the normal flight area, a status of the uncrewed aerial vehicle entering or leaving the normal flight area needs to be reported to the AMF.

The location reporting control message includes a reporting type. The reporting type herein is repeated reporting, that is, each time the access network determines that the UAV enters or leaves the normal flight area, the access network needs to report to the AMF.

S203: The access network sends a location reporting message to the AMF.

The access network sends the location reporting message to the AMF when determining that the UAV enters or leaves the normal flight area.

Certainly, the AMF may alternatively obtain location information of the uncrewed aerial vehicle in another manner, for example, using a data network. This is merely an example for description herein, and no limitation is imposed.

S204: After obtaining flight area exception information of the uncrewed aerial vehicle, the AMF sends a subscription request response message to the UTM.

The subscription request response message includes the identification information of the uncrewed aerial vehicle. The AMF notifies the UTM that the uncrewed aerial vehicle is not located in the normal flight area based on the subscription request response.

S205: The UTM sends a second controller switching notification message to the uncrewed aerial vehicle.

The second controller switching notification message includes second control indication information, where the second control indication information indicates the uncrewed aerial vehicle to determine the UTM as a controller of the uncrewed aerial vehicle.

S206: The uncrewed aerial vehicle sends a session modification request to the AMF.

After receiving the second controller switching notification message, the uncrewed aerial vehicle determines the UTM as the controller of the uncrewed aerial vehicle, that is, the uncrewed aerial vehicle no longer accepts control from the original controller of the uncrewed aerial vehicle, but accepts control from a controller of the UTM. The original controller of the uncrewed aerial vehicle is a controller used when the uncrewed aerial vehicle is located in the normal flight area.

The session modification request includes indication information. The indication information is used to request an SMF to determine information related to the original controller in information used for traffic routing in a UPF as UTM-related information. The related information may be, for example, identification information and an address, where the address may be, for example, an Internet Protocol (IP) address.

S207: The AMF sends the session modification request to the SMF.

After receiving the session modification request, the AMF forwards the session modification request to the SMF.

S208: The SMF sends an N4 session modification request to the UPF.

After receiving the session modification request, if the SMF determines that a session for communication between the controller of the uncrewed aerial vehicle and the uncrewed aerial vehicle needs to be modified, the UTM-related information is determined as the information related to the original controller in the traffic routing information in the UPF.

S209: The UPF sends an N4 session modification response to the SMF.

After the UPF receives the N4 session modification request, the UPF determines the UTM-related information as the information related to the original controller in the information used for traffic routing and sends the N4 session modification response to the SMF. In this way, the UTM is determined as the controller of the uncrewed aerial vehicle.

After the UTM-related information is determined as the information related to the original controller in the information used for traffic routing, if data to be sent to the original controller of the uncrewed aerial vehicle is detected, the data is forwarded to the UTM. The data herein refers to control and command data or another type of data, for example, real-time video information, sent between the controller of the UAV and the UAV. The data may not directly include an identifier of the UTM, but may include other information, for example, a data network name and slice information, that may be used by the UPF to detect and identify the UTM. Similarly, for data from the UTM, if the UPF detects the data to be sent to the UAV, the UPF forwards the data to the UAV.

S210: The UTM sends a first controller switching notification message.

The first controller switching notification message includes first control indication information, where the first control indication information is used to indicate the controller of the uncrewed aerial vehicle to stop controlling the uncrewed aerial vehicle. A manner in which the uncrewed aerial vehicle stops controlling the uncrewed aerial vehicle may include: releasing the session between the controller of the uncrewed aerial vehicle and the uncrewed aerial vehicle, determining the UTM as the controller of the uncrewed aerial vehicle in a context of the session between the controller of the uncrewed aerial vehicle and the uncrewed aerial vehicle, determining the UTM as the controller of the uncrewed aerial vehicle in the context of the session between the controller of the uncrewed aerial vehicle and the uncrewed aerial vehicle, determining the UTM as the controller of the uncrewed aerial vehicle in session policy information corresponding to both the controller of the uncrewed aerial vehicle and the uncrewed aerial vehicle, or deleting session policy information between the controller of the uncrewed aerial vehicle and the uncrewed aerial vehicle from session policy information.

The UTM may send the first controller switching notification message to a C-SMF, a C-PCF, or the controller of the uncrewed aerial vehicle. That the UTM sends the first controller switching notification message to the C-SMF, the C-PCF, or the controller of the uncrewed aerial vehicle is a parallel solution, that is, only one of the solutions is performed. For example, if the UTM sends the first controller switching notification message to the C-SMF, the UTM does not send the first controller switching notification message to the C-PCF or the controller of the uncrewed aerial vehicle.

If the UTM sends the first controller switching notification message to the controller of the uncrewed aerial vehicle, steps S211a, S212, S213, S216, and S217 are performed. If the UTM sends the first controller switching notification message to the C-PCF, steps S211b, S212, S213, S214, S215, S216, and S217 are performed. If the UTM sends the first controller switching notification message to the C-SMF, S212, S213, S214, S215, S216, and S217 are performed.

In this application, a device with a prefix "C-" and a device without the prefix "C-" are only distinguished in written forms, and may be a same device or different devices. For example, the C-SMF and the SMF may be a same device or different devices. The C-PCF and the PCF may be a same device or different devices.

S211a: When the first controller switching message is sent to the controller of the uncrewed aerial vehicle, the controller of the uncrewed aerial vehicle sends a session modification request to a C-AMF, and the C-AMF sends the session modification request to the C-SMF.

After receiving the first controller switching notification message, the controller of the uncrewed aerial vehicle stops controlling the uncrewed aerial vehicle, and sends the session modification request to the C-AMF. After receiving the session modification request, the C-AMF forwards the session modification request to the S-SMF.

The session modification request may be used to request the C-SMF to delete information related to the uncrewed aerial vehicle in the context of the session between the controller of the uncrewed aerial vehicle and the uncrewed aerial vehicle. Deleted information may be the information related to the uncrewed aerial vehicle, such as identification information and an IP address, such that the controller of the uncrewed aerial vehicle stops controlling the uncrewed aerial vehicle. The session modification request may alternatively be used to request the C-SMF to release the session between the original controller of the uncrewed aerial vehicle and the uncrewed aerial vehicle, such that the controller of the uncrewed aerial vehicle stops controlling the uncrewed aerial vehicle.

A controller of an uncrewed aerial vehicle may simultaneously control a plurality of uncrewed aerial vehicles. In this case, the session modification request is used to request the C-SMF to delete the uncrewed aerial vehicles in a session between the controller of the uncrewed aerial vehicle and the uncrewed aerial vehicles. If a controller of an uncrewed aerial vehicle controls only one uncrewed aerial vehicle, the session modification request is used to request the C-SMF to release a session between the original controller of the uncrewed aerial vehicle and the one uncrewed aerial vehicle.

After the SMF completes modification, the SMF may send a session modification response to the controller of the uncrewed aerial vehicle. The session modification response indicates that the SMF has completed the modification of the session. Certainly, the SMF may alternatively not send the session modification response.

In this embodiment of this application, the session modification request may include modifying a session or releasing a session.

S211b: When the first controller switching notification message is sent to the C-PCF, the C-PCF sends a policy modification message to the C-SMF.

After the C-PCF receives the first controller switching notification message, the C-PCF deletes information related to the uncrewed aerial vehicle from the session policy information corresponding to both the controller of the uncrewed aerial vehicle and the uncrewed aerial vehicle, where the related information may be, for example, identification information or an IP address. After a session policy is deleted, the session between the controller of the uncrewed aerial vehicle and the uncrewed aerial vehicle is released.

S212: The C-SMF sends an N4 session modification request to a C-UPF.

After receiving the session modification request or the policy modification request, the C-SMF performs a corresponding operation.

For example, after receiving the session modification request, if the C-SMF determines that the session modification request is used by the C-SMF to delete the information related to the uncrewed aerial vehicle from the context of the session between the controller of the uncrewed aerial vehicle and the uncrewed aerial vehicle, the C-SMF deletes the information related to the uncrewed aerial vehicle; or if the session modification request is used to request the C-SMF to release the session between the original controller of the uncrewed aerial vehicle and the uncrewed aerial vehicle, the C-SMF releases the session between the original controller of the uncrewed aerial vehicle and the uncrewed aerial vehicle.

After receiving the policy modification request, the C-SMF deletes the information related to the uncrewed aerial vehicle from the session policy information corresponding to the controller of the uncrewed aerial vehicle and the uncrewed aerial vehicle if the C-SMF determines that the policy modification request is used to request to delete the information related to the uncrewed aerial vehicle from the session policy information corresponding to both the controller of the uncrewed aerial vehicle and the uncrewed aerial vehicle.

S213: The C-UPF sends an N4 session modification response to the C-SMF.

The N4 session modification response is sent to notify the C-SMF that an operation requested by the C-SMF has been performed.

S214: The C-SMF sends a session modification command to the controller of the uncrewed aerial vehicle.

The session modification command may include a reason for controller switching, directly indicate to the controller that controller switching needs to be performed, or indicate that the UAV is not located in the normal flight area. The reason for controller switching may include: The controller of the uncrewed aerial vehicle needs to be switched because the uncrewed aerial vehicle is not located in the normal flight area, and so on.

The session modification command herein may alternatively be a session release command. A function of the session modification command and the session release command is to indicate the controller of the uncrewed aerial vehicle to stop controlling the uncrewed aerial vehicle.

S215: The controller of the uncrewed aerial vehicle sends a session modification complete response to the C-SMF.

After determining that the command has been received, the controller of the uncrewed aerial vehicle no longer controls the uncrewed aerial vehicle or sends data to the uncrewed aerial vehicle, but sends the session modification complete response to the C-SMF.

S216: The UTM determines that the UAV has reached the normal flight area.

After the UTM takes control of the uncrewed aerial vehicle, the UTM controls the uncrewed aerial vehicle to enter the normal flight area.

The UTM may determine, using the access network, that the UAV has reached the normal flight area. A determining manner may be that the UAV has reached the normal flight area is determined based on a location report reported by the access network. Certainly, that the UAV has reached the normal flight area may alternatively be determined in another manner, for example, based on location information reported by the uncrewed aerial vehicle. This is merely an example for description herein, and is not specifically limited.

S217: The controller of the uncrewed aerial vehicle is determined to control the uncrewed aerial vehicle.

After the UTM determines that the UAV has reached the normal flight area, the UTM returns control over the UAV to the original controller of the uncrewed aerial vehicle.

That the controller of the uncrewed aerial vehicle is determined to control the uncrewed aerial vehicle may be understood as: After the uncrewed aerial vehicle enters the normal area, the UTM returns control over the uncrewed aerial vehicle to the original controller of the uncrewed aerial vehicle. For an implementation, refer to the implementations of the foregoing steps S201 to S217. Details are not described herein again.

If the session between the original controller of the uncrewed aerial vehicle and the uncrewed aerial vehicle is released, the session between the original controller of the uncrewed aerial vehicle and the uncrewed aerial vehicle needs to be re-established. If the session is not released, the original controller of the uncrewed aerial vehicle is determined as the controller of the uncrewed aerial vehicle.

There is no execution sequence between steps S212 and S213 and steps S214 and S215. That is, steps S212 and S213 may be performed before steps S214 and S215, or may be performed after steps S214 and S215, or steps S212 and S213 and steps S214 and S215 may be simultaneously performed.

There is no execution sequence between steps S205 to S209 and steps S210 to S215. That is, steps S205 to S209 may be performed before steps S210 to S215, or may be performed after steps S210 to S215, or steps S205 to S209 and steps S210 to S215 may be simultaneously performed.

In this embodiment, when determining that the uncrewed aerial vehicle is not located in the normal flight area, the UTM directly sends the first controller switching notification message to the uncrewed aerial vehicle, and the uncrewed aerial vehicle initiates an action of modifying the controller of the uncrewed aerial vehicle, such that controller switching can be performed from a perspective of the uncrewed aerial vehicle. This can improve stability during control switching.

Figure 3A:
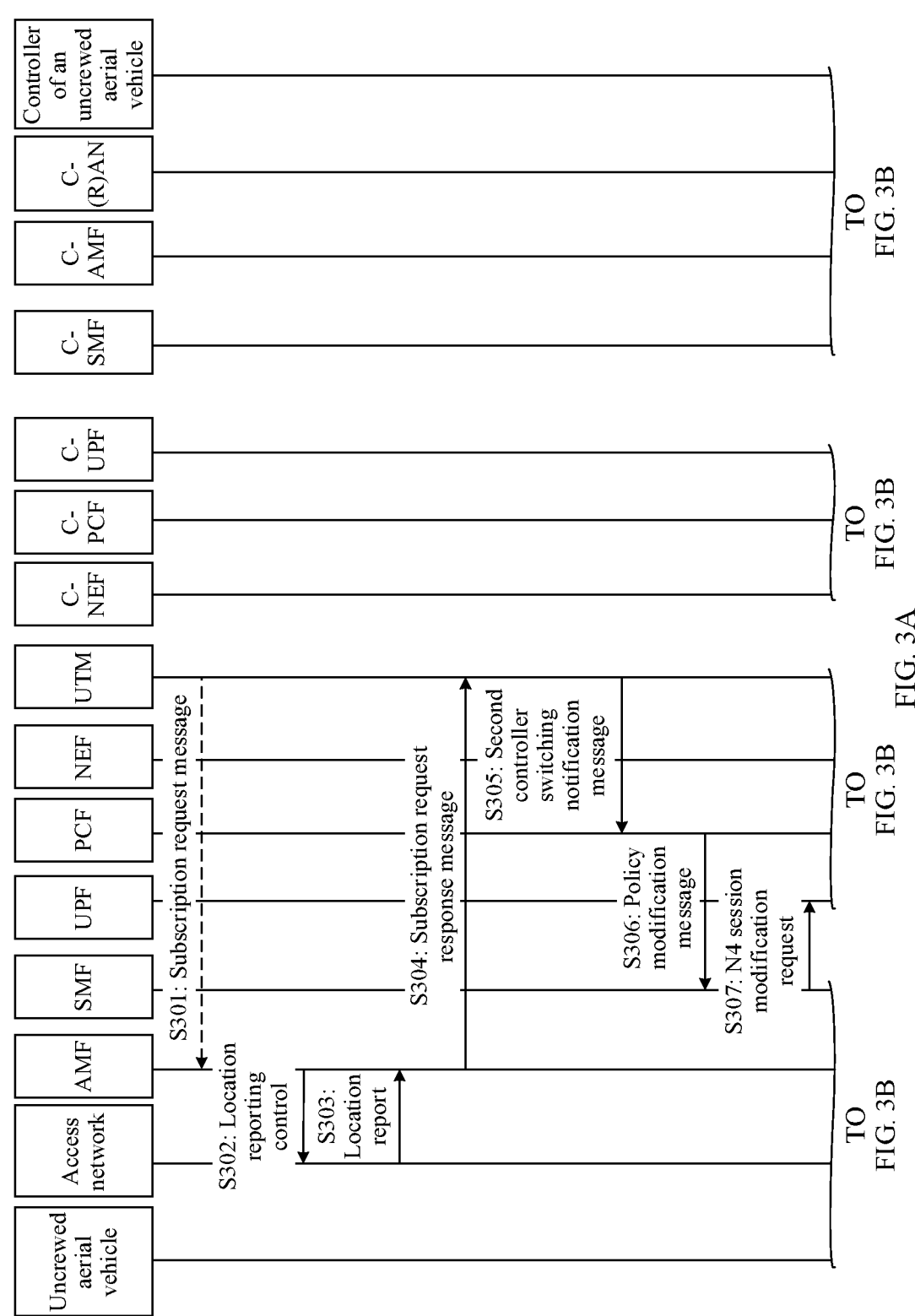
FIG. 3A to FIG. 3C are a schematic interaction diagram of another flight area management method for an uncrewed aerial vehicle according to an embodiment of this application.
Figure 3B:
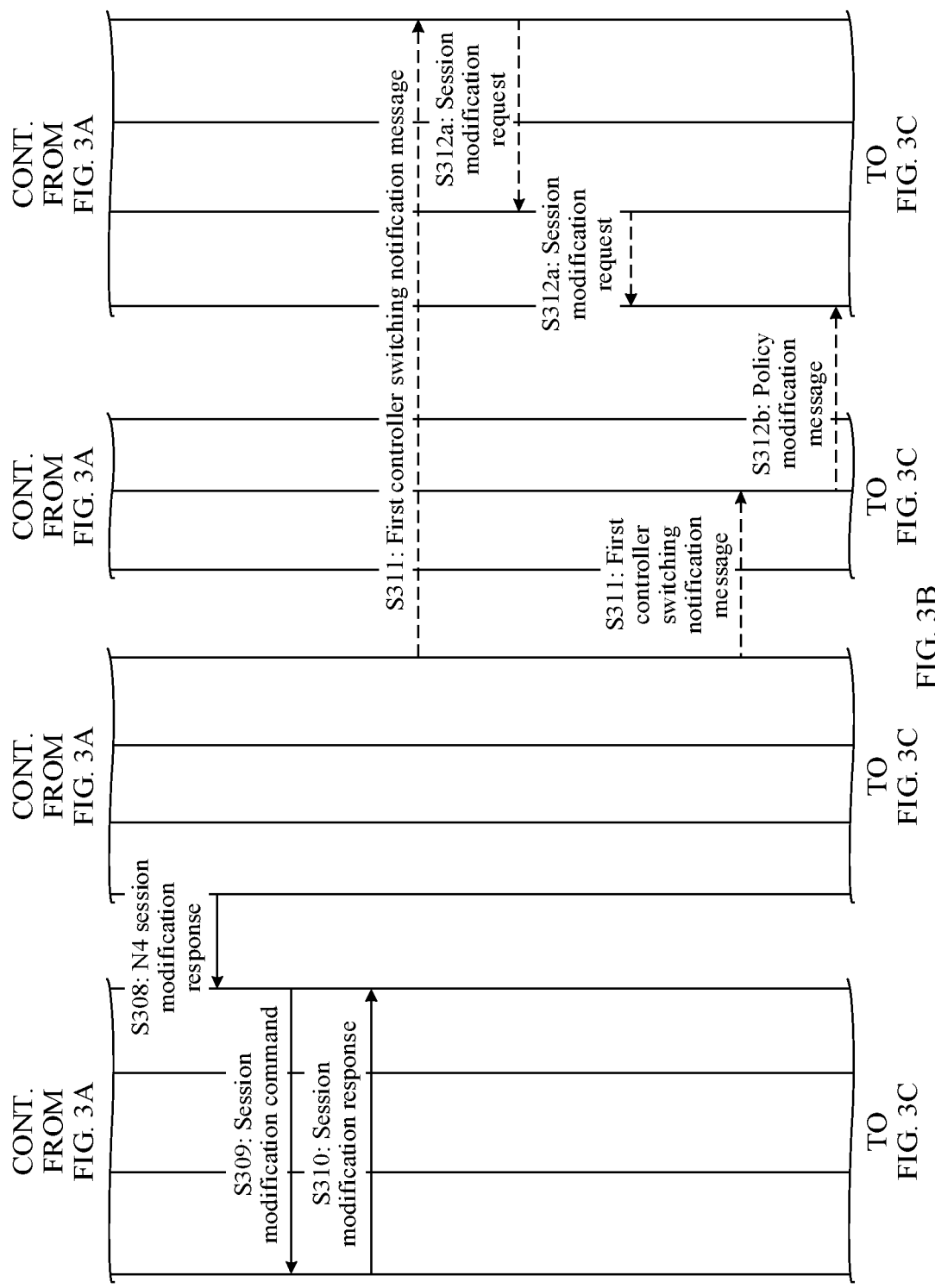
Figure 3C:
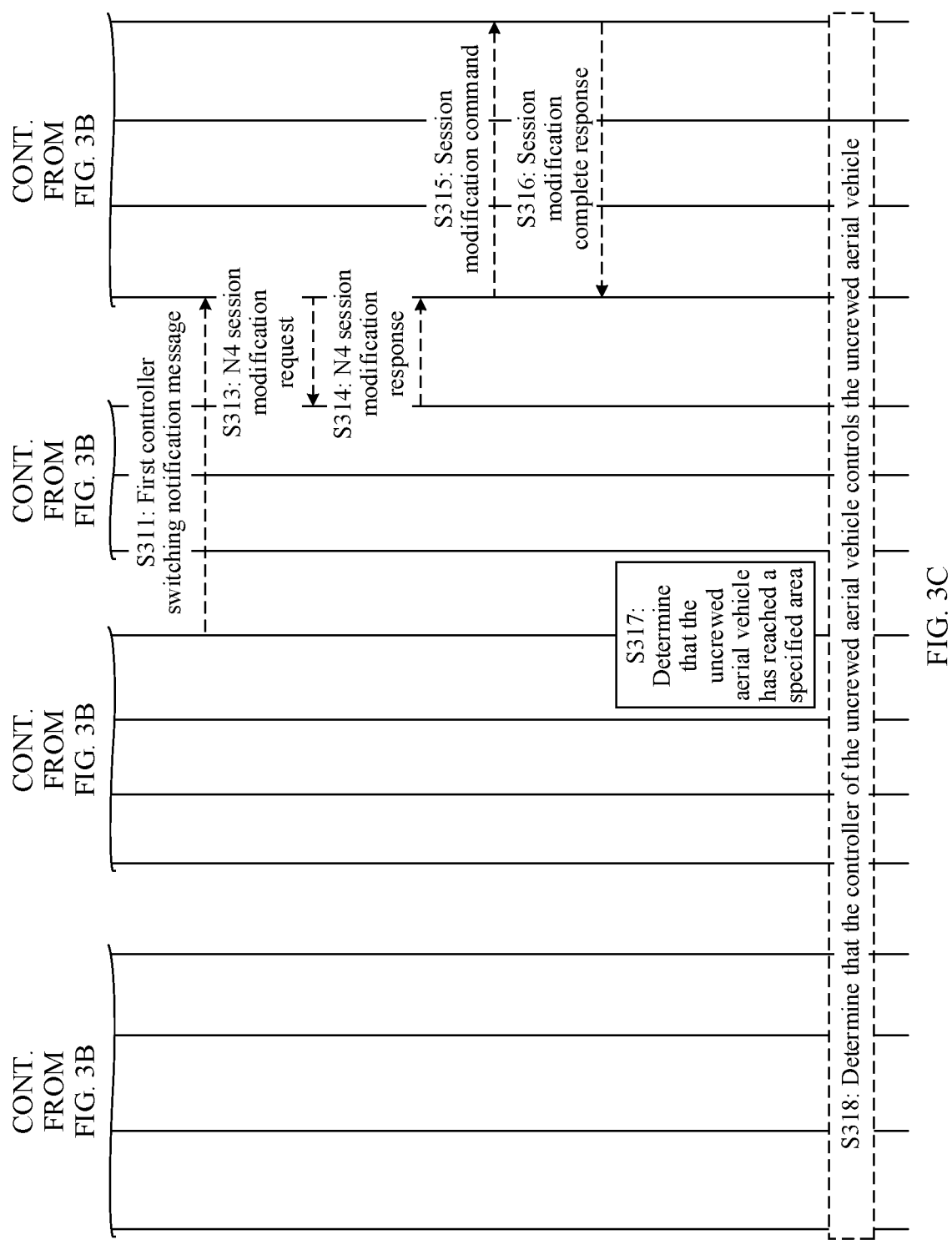

FIG. 3A to FIG. 3C are a schematic interaction diagram of another flight area management method for an uncrewed aerial vehicle according to an embodiment of this application. As shown in FIG. 3A to FIG. 3C, the flight area management method includes steps S301 to S318. The steps are as follows.

S301: A UTM sends a subscription request message to an AMF.

S302: The AMF sends a location reporting control message to an access network.

S303: The access network sends a location reporting message to the AMF.

S304: After obtaining flight area exception information of the uncrewed aerial vehicle, the AMF sends a subscription request response message to the UTM.

For implementations of steps S301 to S304, refer to implementations of steps S201 to S204. Details are not described herein again.

S305: The UTM sends a second controller switching notification message to a PCF.

The second controller switching notification message includes second control indication information.

S306: The PCF sends a policy modification message to an SMF.

After receiving the second controller switching notification message, the PCF determines, based on an indication of the second control indication information, session policy information corresponding to a session between a controller of the uncrewed aerial vehicle and the uncrewed aerial vehicle, and sends the policy modification message to the SMF. The policy modification message includes the session policy information corresponding to the session between the controller of the uncrewed aerial vehicle and the uncrewed aerial vehicle. The session policy information includes route forwarding information, where the route forwarding information may be, for example, address information.

S307: The SMF sends an N4 session modification request to a UPF.

After receiving the policy modification message, the SMF determines the UTM as the controller of the uncrewed aerial vehicle in the session policy information corresponding to both the uncrewed aerial vehicle and the controller of the uncrewed aerial vehicle, to determine the UTM as the controller of the uncrewed aerial vehicle. The determining the UTM as the controller of the uncrewed aerial vehicle herein may be: determining identification information, an IP address, and the like of the UTM as identification information, an address, and the like of the controller of the uncrewed aerial vehicle, where the identification information may be understood as the route forwarding information, and the address of the UTM may be an internet protocol address (IP address) or the like. After determining the UTM as the controller of the uncrewed aerial vehicle in the session policy information corresponding to both the uncrewed aerial vehicle and the controller of the uncrewed aerial vehicle, the SMF sends the N4 session modification request to the UPF.

S308: The UPF sends an N4 session modification response to the SMF.

After receiving the N4 session modification request, the UPF determines the UTM as the controller of the uncrewed aerial vehicle in the session policy information corresponding to both the uncrewed aerial vehicle and the controller of the uncrewed aerial vehicle, and sends the N4 session modification response to the SMF. In this way, the UTM is determined as the controller of the uncrewed aerial vehicle.

S309: The SMF sends a session modification command to the uncrewed aerial vehicle.

S310: The uncrewed aerial vehicle sends a session modification response to the SMF.

For implementations of steps S309 and S310, refer to implementations of steps S214 and S215 in the foregoing embodiment. Details are not described herein again.

S311: The UTM sends a first controller switching notification message.

S312a: When the first controller switching message is sent to the controller of the uncrewed aerial vehicle, the controller of the uncrewed aerial vehicle sends a session modification request to a C-AMF, and the C-AMF sends the session modification request to a C-SMF.

S312b: When the first controller switching notification message is sent to a C-PCF, the C-PCF sends a policy modification message to the C-SMF.

S313: The C-SMF sends an N4 session modification request to a C-UPF.

S314: The C-UPF sends an N4 session modification response to the C-SMF.

S315: The C-SMF sends a session modification command to the controller of the uncrewed aerial vehicle.

S316: The controller of the uncrewed aerial vehicle sends a session modification complete response to the C-SMF.

S317: The UTM determines that the UAV has reached a normal flight area.

S318: The controller of the uncrewed aerial vehicle is determined to control the uncrewed aerial vehicle.

For implementations of steps S311 to S318, refer to implementations of steps S210 to S217 in the foregoing embodiment. Details are not described herein again.

In this example, when determining that the uncrewed aerial vehicle is not located in the normal flight area, the UTM sends the first controller switching notification message to the PCF; modifies, via the PCF and the SMF, the session policy information corresponding to the session between the controller of the uncrewed aerial vehicle and the uncrewed aerial vehicle; and determines the identification information of the UTM as the identification information of the controller of the uncrewed aerial vehicle in the session policy information, such that the UTM is determined as the controller of the uncrewed aerial vehicle, and the controller of the uncrewed aerial vehicle may be quickly switched to the UTM. This improves switching efficiency of the controller of the uncrewed aerial vehicle.

Figure 4A:
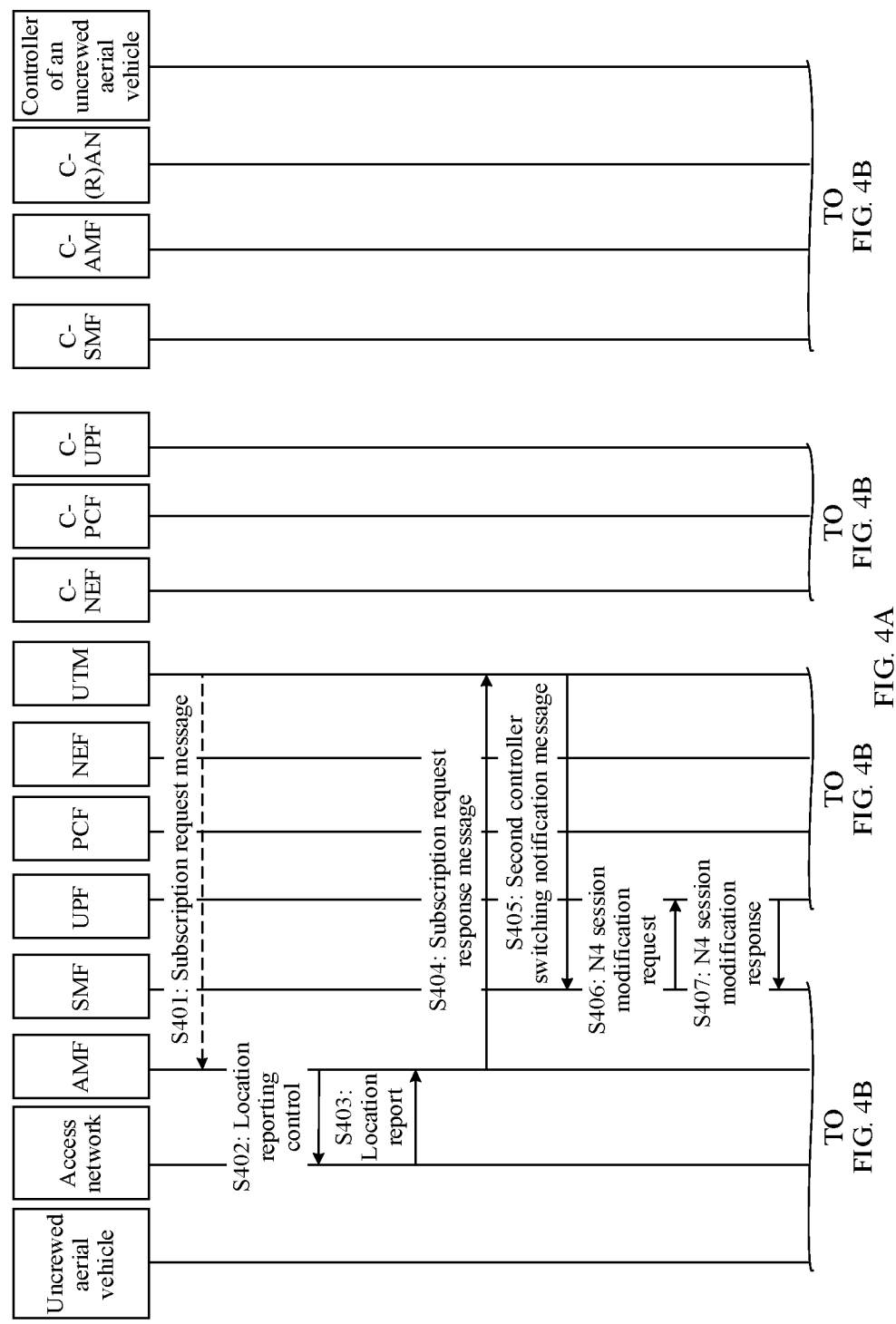
FIG. 4A to FIG. 4C are a schematic interaction diagram of another flight area management method for an uncrewed aerial vehicle according to an embodiment of this application.
Figure 4B:
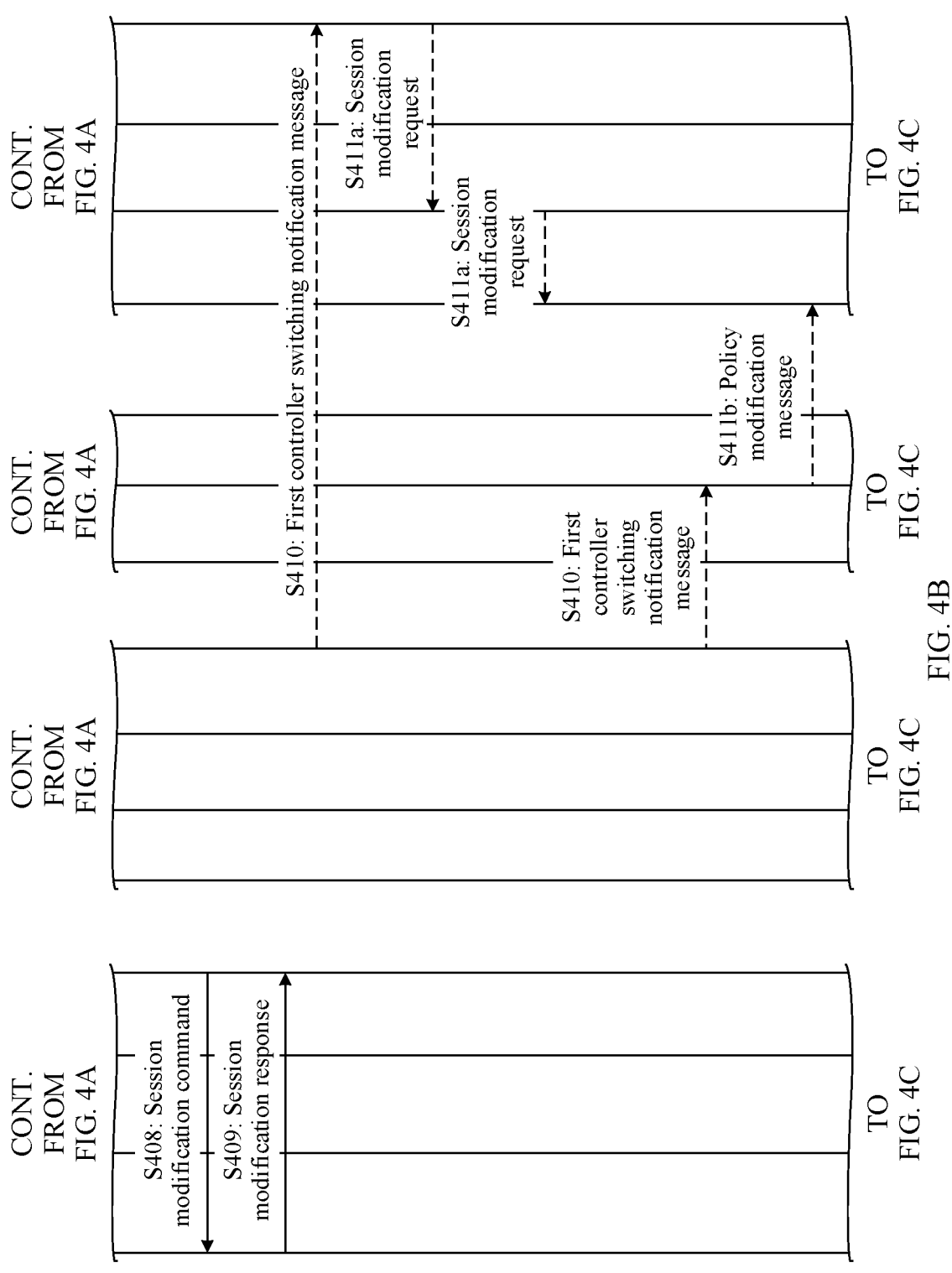
Figure 4C:
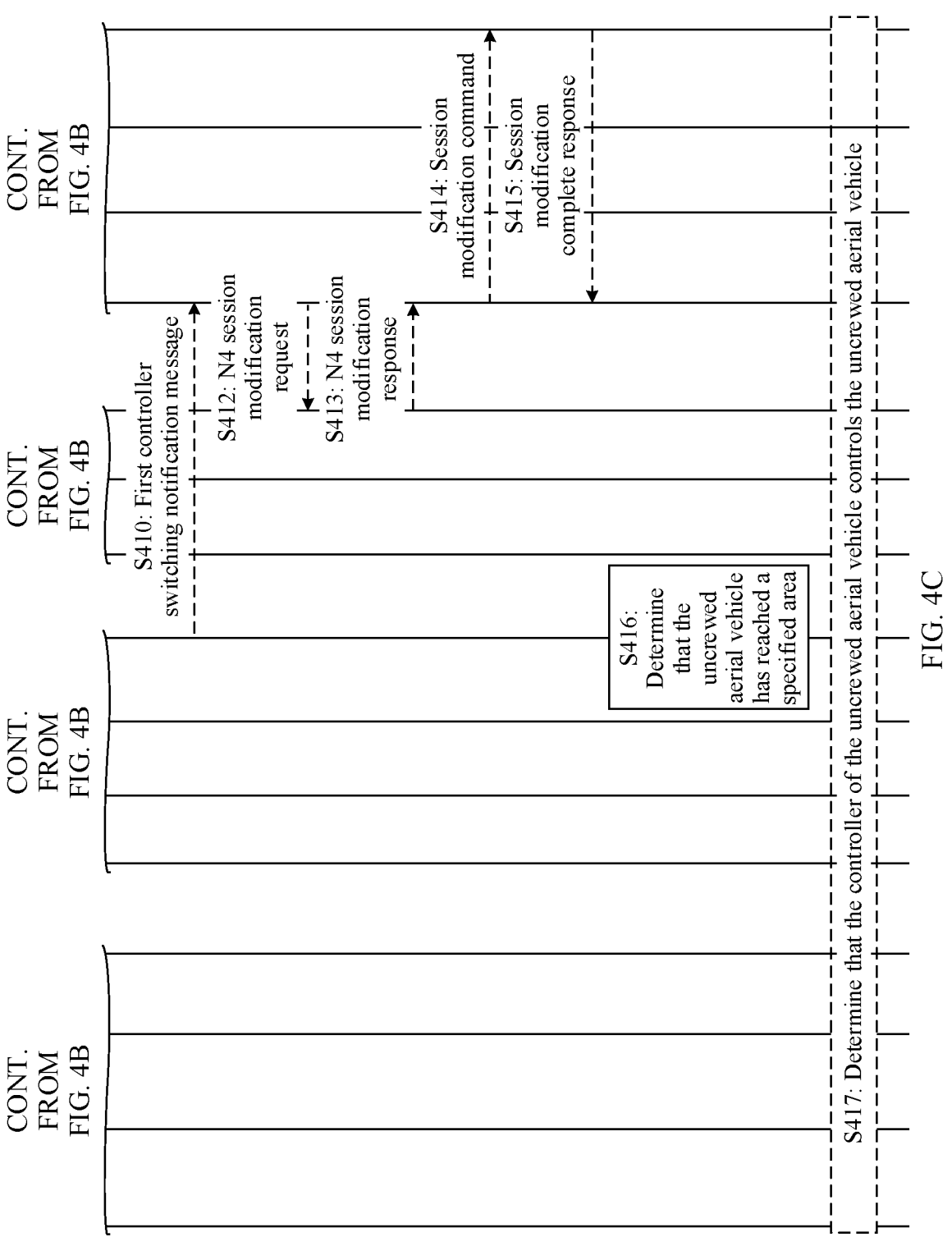
Figure 5A:
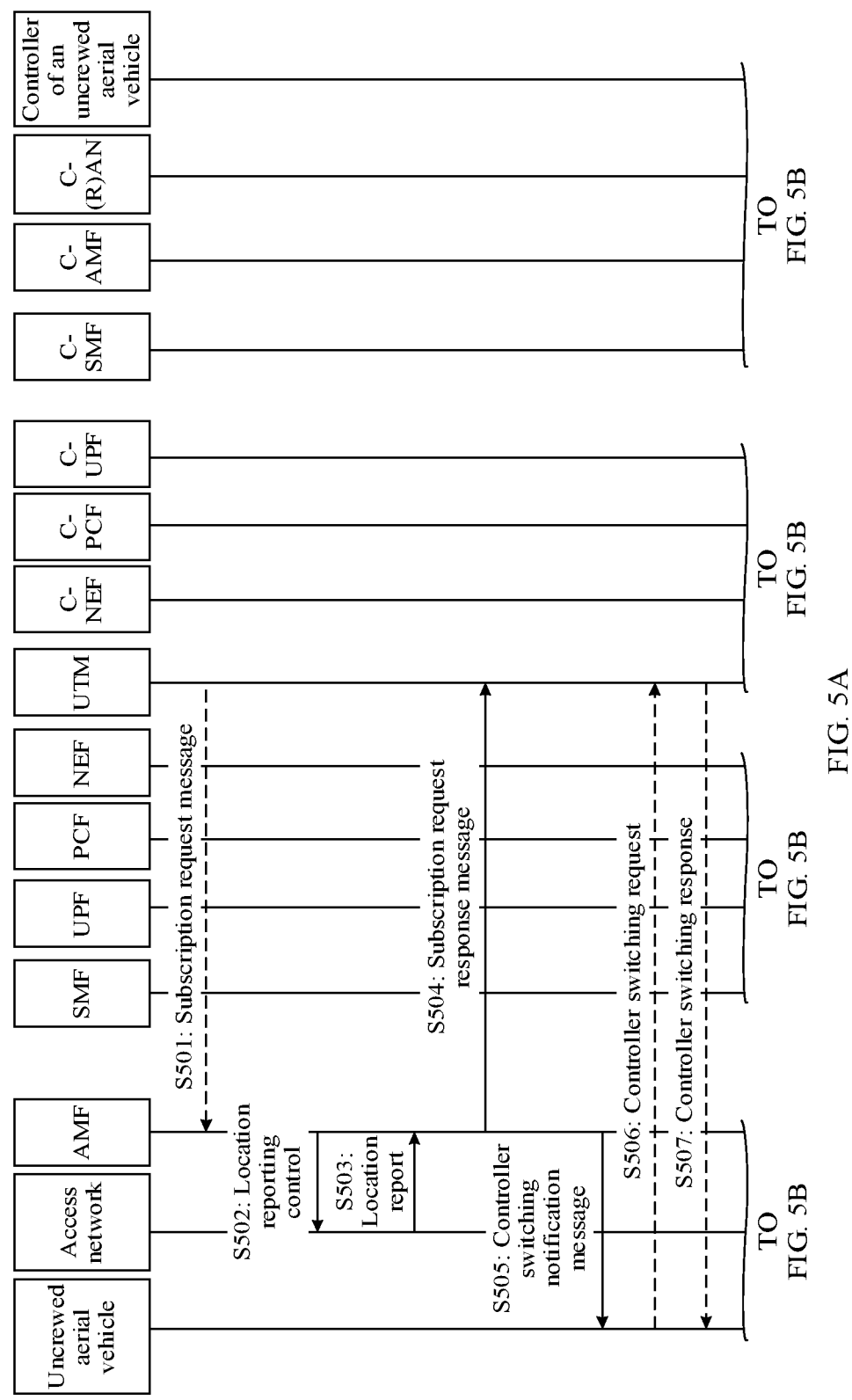
FIG. 5A to FIG. 5D are a schematic interaction diagram of another flight area management method for an uncrewed aerial vehicle according to an embodiment of this application.
Figure 5B:
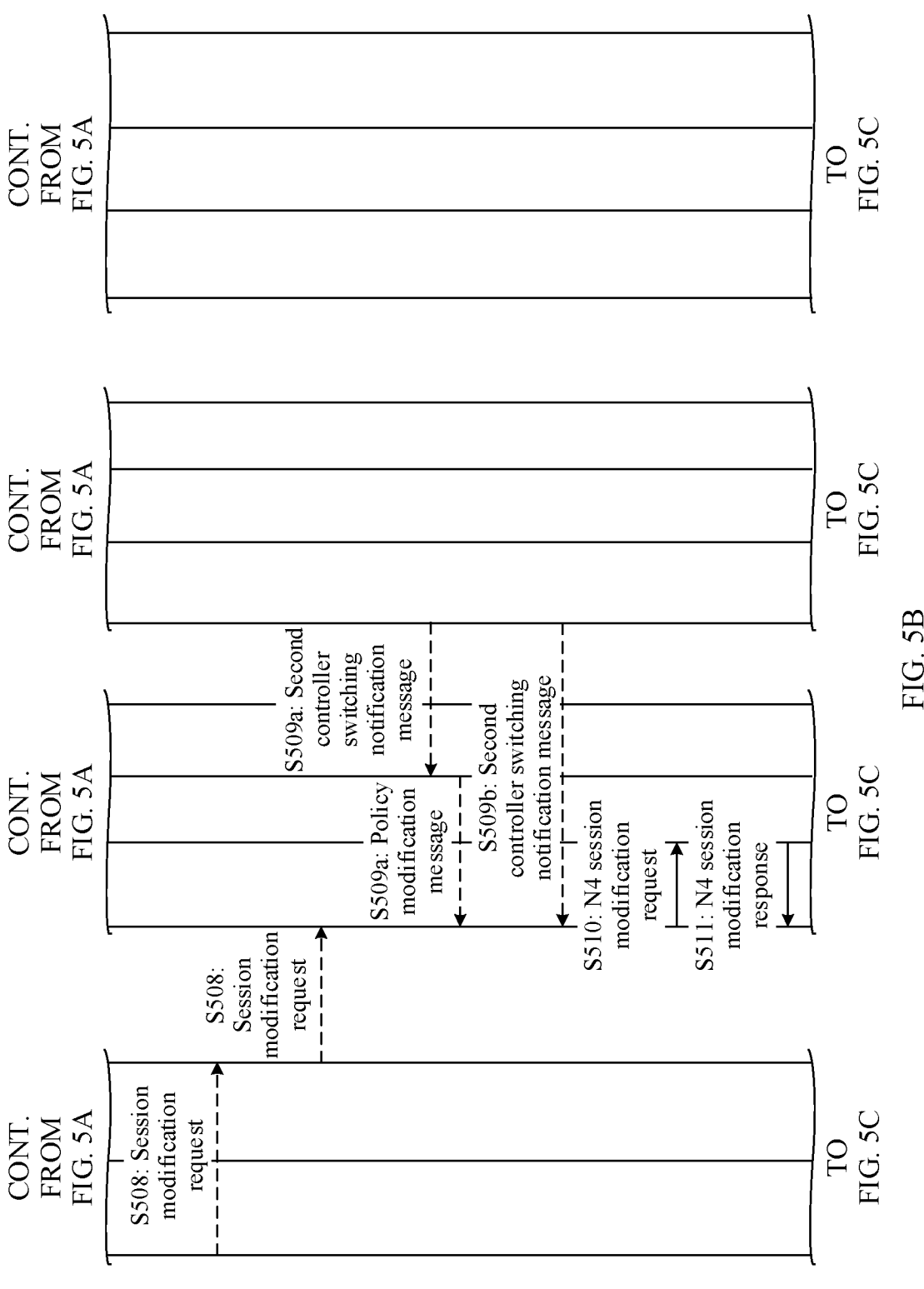
Figure 5C:
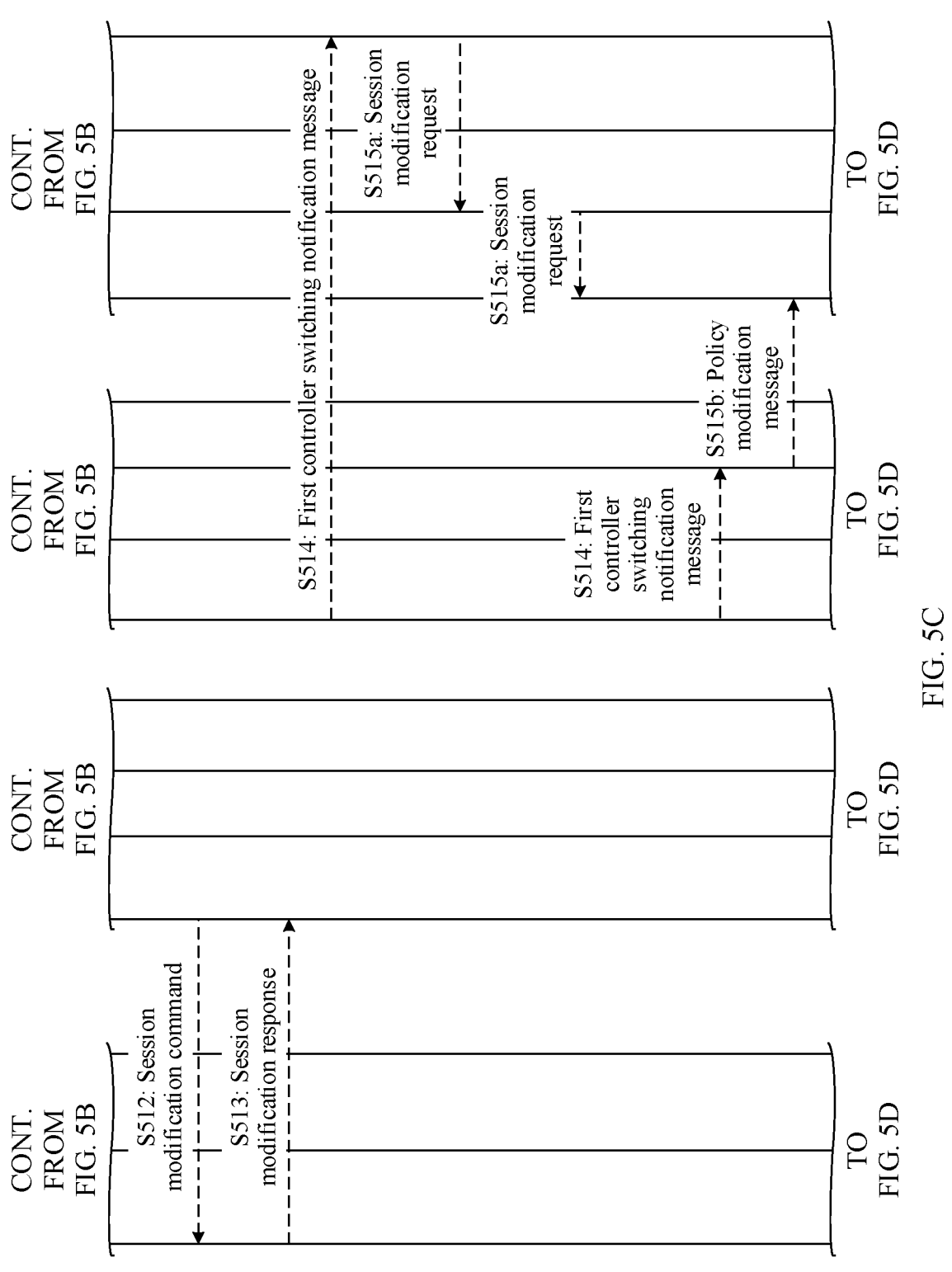
Figure 5D:
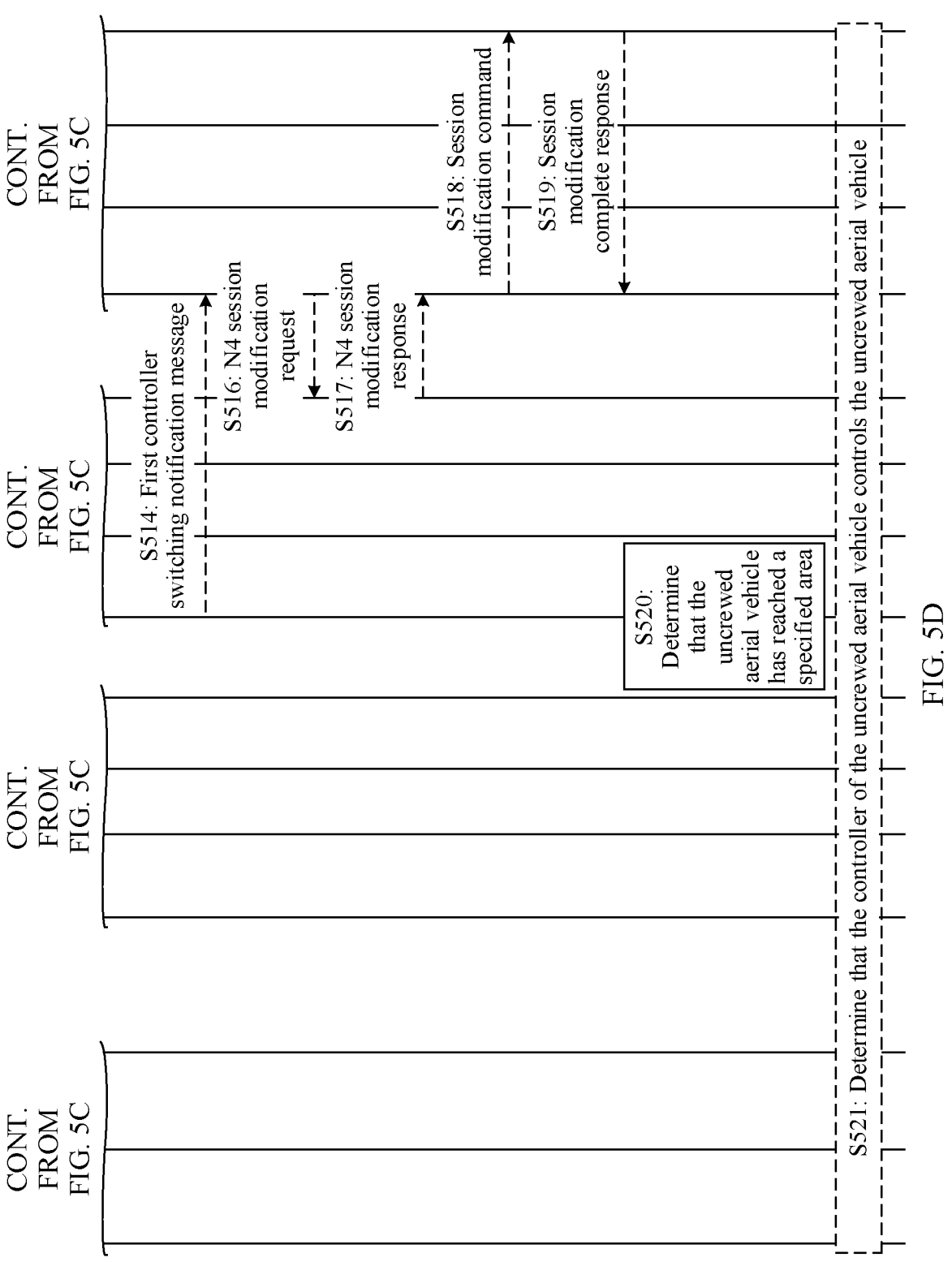

FIG. 4A to FIG. 4C are a schematic interaction diagram of another flight area management method for an uncrewed aerial vehicle according to an embodiment of this application. As shown in FIG. 4A to FIG. 4C, the flight area management method includes steps S401 to S417. The steps are as follows.

S401: A UTM sends a subscription request message to an AMF.

S402: The AMF sends a location reporting control message to an access network.

S403: The access network sends a location reporting message to the AMF.

S404: After obtaining flight area exception information of the uncrewed aerial vehicle, the AMF sends a subscription request response message to the UTM.

For implementations of steps S401 to S404, refer to implementations of steps S201 to S204. Details are not described herein again.

S405: The UTM sends a second controller switching notification message to an SMF.

The second controller switching notification message includes second control indication information.

S406: The SMF sends an N4 session modification request to a UPF.

After receiving the second controller switching notification message, the SMF determines the UTM as a controller of the uncrewed aerial vehicle in a context of a session corresponding to both the uncrewed aerial vehicle and the controller of the uncrewed aerial vehicle, to determine the UTM as the controller of the uncrewed aerial vehicle. The determining the UTM as the controller of the uncrewed aerial vehicle herein may be: determining identification information, an IP address, and the like of the UTM as identification information, an address, and the like of the controller of the uncrewed aerial vehicle, where the identification information may be understood as route forwarding information, an identity, or the like, and the address of the UTM may be an IP address or the like.

After determining the UTM as the controller of the uncrewed aerial vehicle in the context of the session corresponding to both the uncrewed aerial vehicle and the controller of the uncrewed aerial vehicle, the SMF sends the N4 session modification request to the UPF.

S407: The UPF sends an N4 session modification response to the SMF.

After receiving the N4 session modification request, the UPF determines the UTM as the controller of the uncrewed aerial vehicle in the context of the session corresponding to both the uncrewed aerial vehicle and the controller of the uncrewed aerial vehicle, and sends the N4 session modification response to the SMF, to complete determining the UTM as the controller of the uncrewed aerial vehicle.

S408: The SMF sends a session modification command to the uncrewed aerial vehicle.

S409: The uncrewed aerial vehicle sends a session modification response to the SMF.

For implementations of steps S408 and S409, refer to implementations of steps S214 and S215 in the foregoing embodiment. Details are not described herein again.

S410: The UTM sends a first controller switching notification message.

S411a: When the first controller switching message is sent to the controller of the uncrewed aerial vehicle, the controller of the uncrewed aerial vehicle sends a session modification request to a C-AMF, and the C-AMF sends the session modification request to a C-SMF.

S411b: When the first controller switching notification message is sent to a C-PCF, the C-PCF sends a policy modification message to the C-SMF.

S412: The C-SMF sends an N4 session modification request to a C-UPF.

S413: The C-UPF sends an N4 session modification response to the C-SMF.

S414: The C-SMF sends a session modification command to the controller of the uncrewed aerial vehicle.

S415: The controller of the uncrewed aerial vehicle sends a session modification complete response to the C-SMF.

S416: The UTM determines that the UAV has reached a normal flight area.

S417: The controller of the uncrewed aerial vehicle is determined to control the uncrewed aerial vehicle.

For implementations of steps S410 to S417, refer to implementations of steps S210 to S217 in the foregoing embodiment. Details are not described herein again.

In this example, when determining that the uncrewed aerial vehicle is not located in the normal flight area, the UTM sends the second controller switching notification message to the SMF; modifies, via the SMF, session policy information corresponding to the session between the controller of the uncrewed aerial vehicle and the uncrewed aerial vehicle; and determines the identification information of the UTM as the identification information of the controller of the uncrewed aerial vehicle in the session policy information, such that the UTM is determined as the controller of the uncrewed aerial vehicle, and the controller of the uncrewed aerial vehicle may be quickly switched to the UTM. This improves switching efficiency of the controller of the uncrewed aerial vehicle.

FIG. 5A to FIG. 5D are a schematic interaction diagram of another flight area management method for an uncrewed aerial vehicle according to an embodiment of this application. As shown in FIG. 5A to FIG. 5D, the flight area management method includes steps S501 to S521. The steps are as follows.

S501: A UTM sends a subscription request message to an AMF.

S502: The AMF sends a location reporting control message to an access network.

S503: The access network sends a location reporting message to the AMF.

S504: After obtaining flight area exception information of the uncrewed aerial vehicle, the AMF sends a subscription request response message to the UTM.

For implementations of steps S501 to S504, refer to implementations of steps S201 to S204. Details are not described herein again.

S505: The AMF sends a controller switching notification message to the uncrewed aerial vehicle.

The controller switching notification message indicates the uncrewed aerial vehicle to determine the UTM as a controller of the uncrewed aerial vehicle. This may be understood as: indicating the uncrewed aerial vehicle to no longer accept control of the original controller and requesting to be controlled by the UTM.

The controller switching notification message may include area information of a normal flight area and/or an indication of specific area information, to indicate the uncrewed aerial vehicle to enter the normal flight area or move to an area indicated by the specific area information.

There is no execution sequence between step S504 and step S505.

After the uncrewed aerial vehicle receives the controller switching notification message, subsequent steps may be performed in the following manner:

(1) Steps S506, S507, S508, S510, and S511 are performed, to determine the UTM as the uncrewed aerial vehicle;

(2) Steps S506, S509a, S510, S511, S512, and S513 are performed, to determine the UTM as the controller of the uncrewed aerial vehicle; or (3) Steps S506, S509b, S510, S511, S512, and S513 are performed, to determine the UTM as the controller of the uncrewed aerial vehicle.

S506: The uncrewed aerial vehicle sends a controller switching request to the UTM.

After receiving the controller switching notification message, the uncrewed aerial vehicle transfers, based on an indication in the controller switching notification message, the indication to an upper-layer application, and the uncrewed aerial vehicle adjusts a location of the uncrewed aerial vehicle based on the indication.

After receiving the controller switching notification message, the uncrewed aerial vehicle may alternatively no longer accept control of the original controller, hover at a current position to wait for control of the UTM, and so on.

S507: The UTM sends a controller switching response to the uncrewed aerial vehicle.

The controller switching response indicates that the UTM accepts to control the uncrewed aerial vehicle. In this case, the uncrewed aerial vehicle sends a session modification request to the AMF, to request to determine the UTM as the controller of the uncrewed aerial vehicle. After the UTM is determined as the controller of the uncrewed aerial vehicle, the UTM may control the uncrewed aerial vehicle.

S508: The uncrewed aerial vehicle sends the session modification request to the AMF, and the AMF forwards the session modification request to an SMF.

S509a: The UTM sends a second controller switching notification message to a PFC, and the PCF sends a policy modification message to the SMF based on the second controller switching notification message.

S509b: The UTM sends the second controller switching notification message to the SMF.

S510: The SMF sends an N4 session modification request to a UPF.

S511: The UPF sends an N4 session modification response to the SMF.

For implementations of steps S508 to S511, refer to corresponding implementations in the foregoing embodiment. Details are not described herein again.

S512: The SMF sends a session modification command to the uncrewed aerial vehicle.

The session modification command may include a reason for session modification. For example, the reason may be that the uncrewed aerial vehicle leaves the normal flight area or the controller needs to be switched. Session modification may be understood as: determining the UTM as the controller of the uncrewed aerial vehicle or changing a session between the controller of the uncrewed aerial vehicle and the uncrewed aerial vehicle to a session between the uncrewed aerial vehicle and the UTM. For a manner of session modification, refer to a modification manner in the foregoing embodiment. Details are not described herein again.

S513: The uncrewed aerial vehicle sends a session modification response to the SMF.

For implementations of steps S512 and S513, refer to implementations of steps S214 and S215 in the foregoing embodiment. Details are not described herein again.

S514: The UTM sends a first controller switching notification message.

S515a: When the first controller switching message is sent to the controller of the uncrewed aerial vehicle, the controller of the uncrewed aerial vehicle sends a session modification request to a C-AMF, and the C-AMF sends the session modification request to a C-SMF.

S515b: When the first controller switching notification message is sent to a C-PCF, the C-PCF sends a policy modification message to the C-SMF.

S516: The C-SMF sends an N4 session modification request to a C-UPF.

S517: The C-UPF sends an N4 session modification response to the C-SMF.

S518: The C-SMF sends a session modification command to the controller of the uncrewed aerial vehicle.

S519: The controller of the uncrewed aerial vehicle sends a session modification complete response to the C-SMF.

S520: The UTM determines that the UAV has reached the normal flight area.

S521: The controller of the uncrewed aerial vehicle is determined to control the uncrewed aerial vehicle.

For implementations of steps S514 to S521, refer to implementations of steps S210 to S217 in the foregoing embodiment. Details are not described herein again.

In this example, when determining that the uncrewed aerial vehicle is not located in the normal flight area, the AMF may directly initiate a modification action for the controller of the uncrewed aerial vehicle, and an action of sending the subscription request response information and the controller switching notification message may be simultaneously performed, such that efficiency of modifying the controller of the uncrewed aerial vehicle can be improved, and the UTM can control the uncrewed aerial vehicle more quickly. This improves controlling safety and stability for the uncrewed aerial vehicle.

Figure 6A:
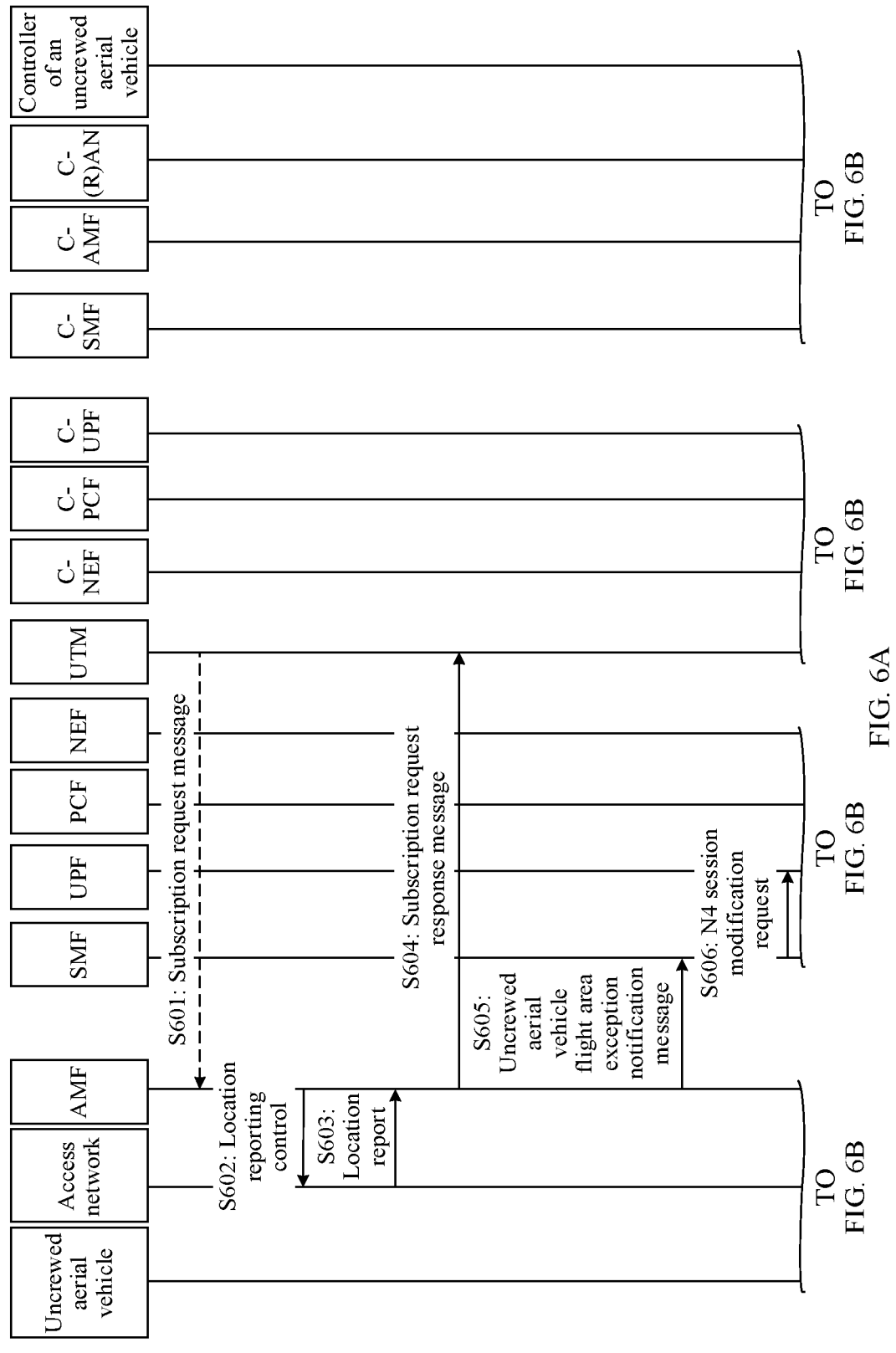
FIG. 6A to FIG. 6C are a schematic interaction diagram of another flight area management method for an uncrewed aerial vehicle according to an embodiment of this application.
Figure 6B:
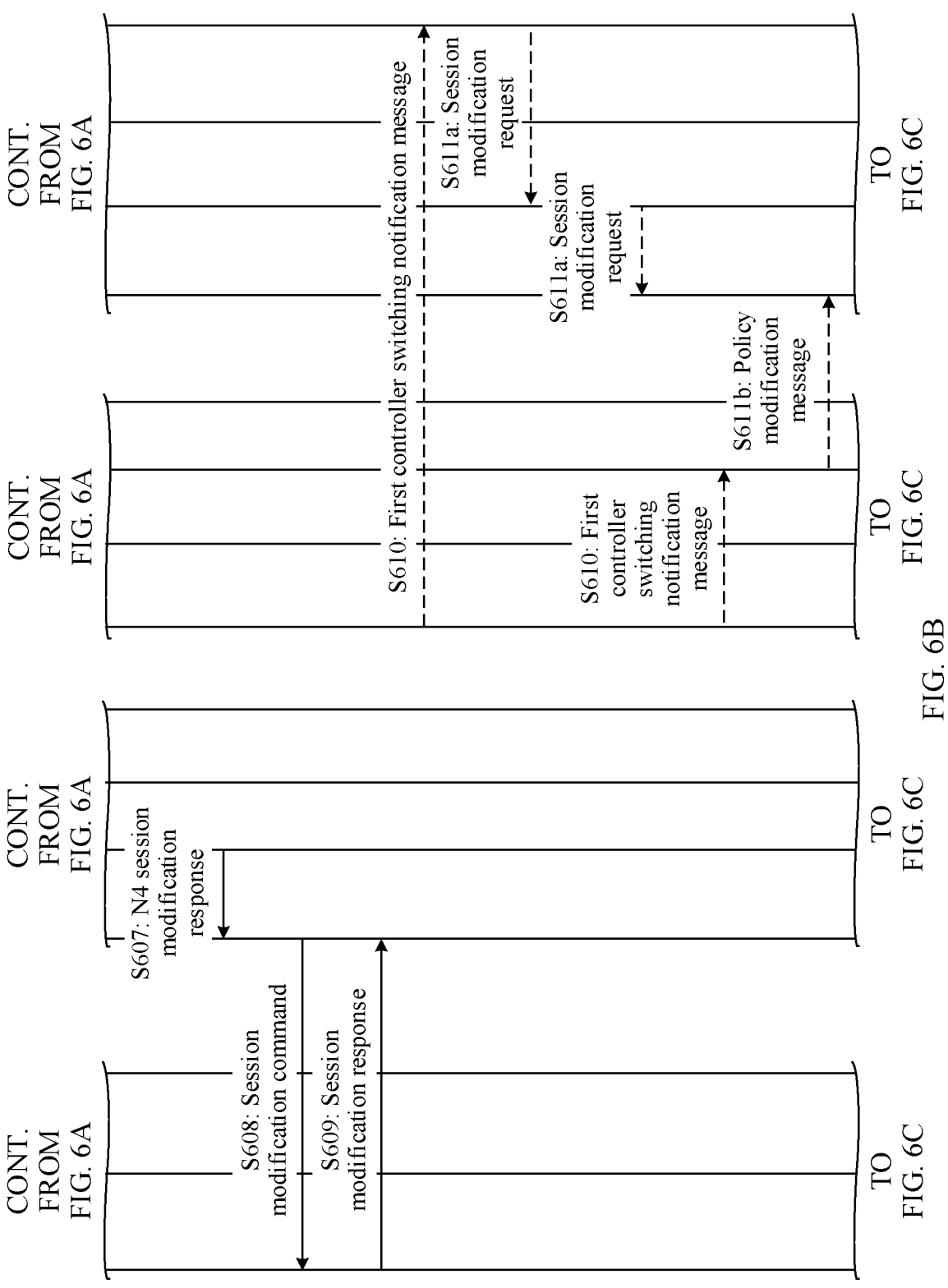
Figure 6C:
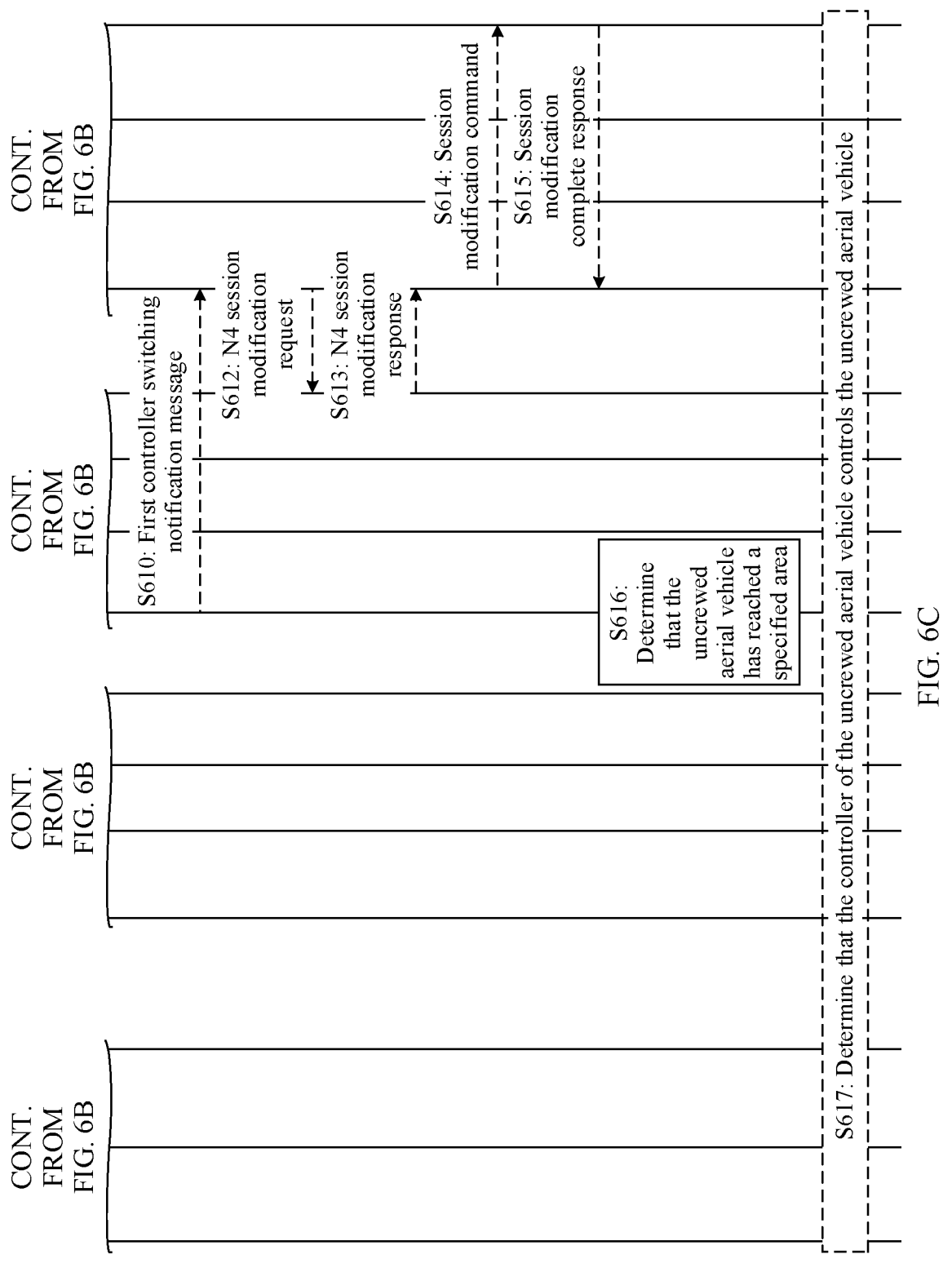
Figure 7A:
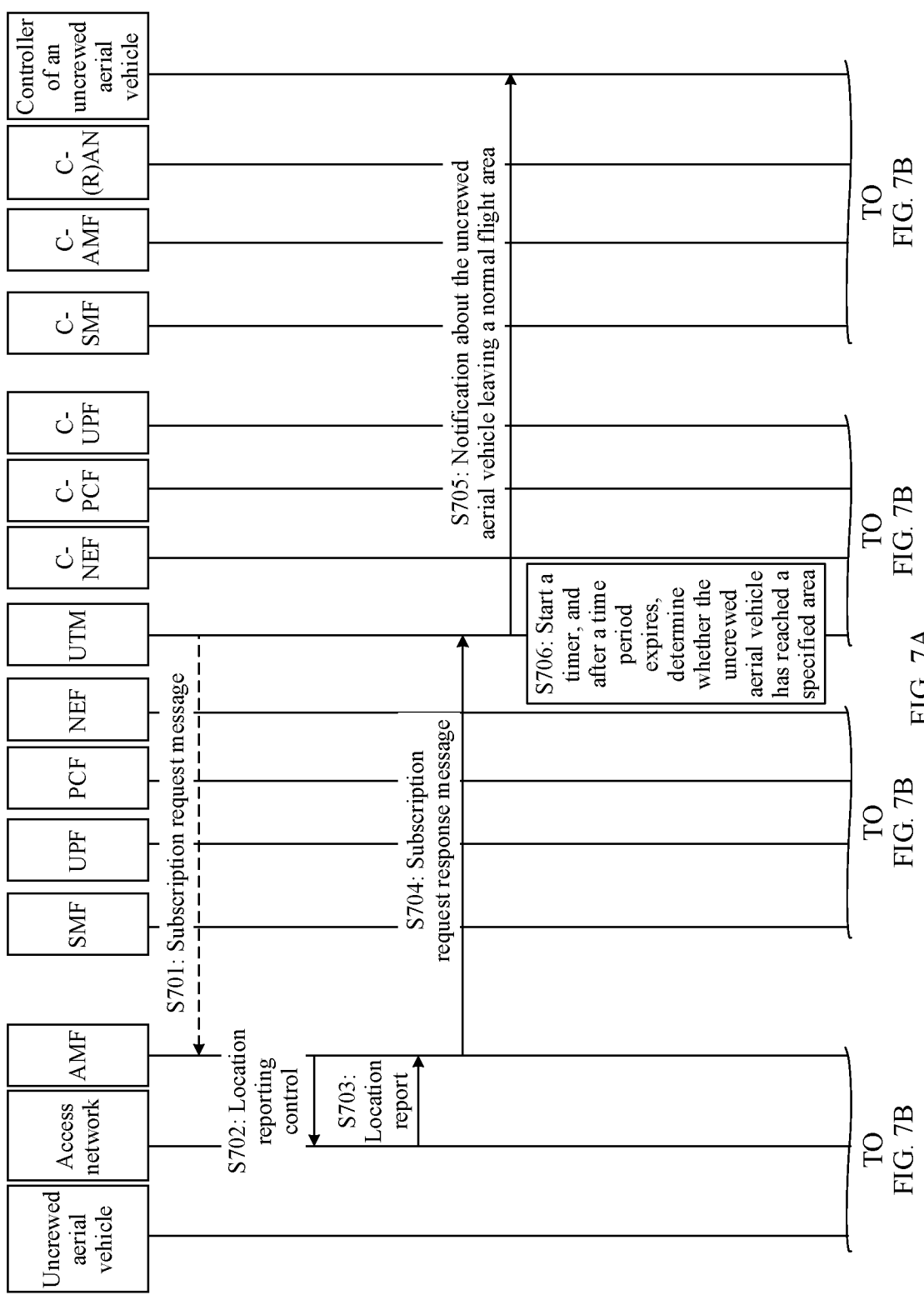
FIG. 7A to FIG. 7D are a schematic interaction diagram of another flight area management method for an uncrewed aerial vehicle according to an embodiment of this application.
Figure 7B:
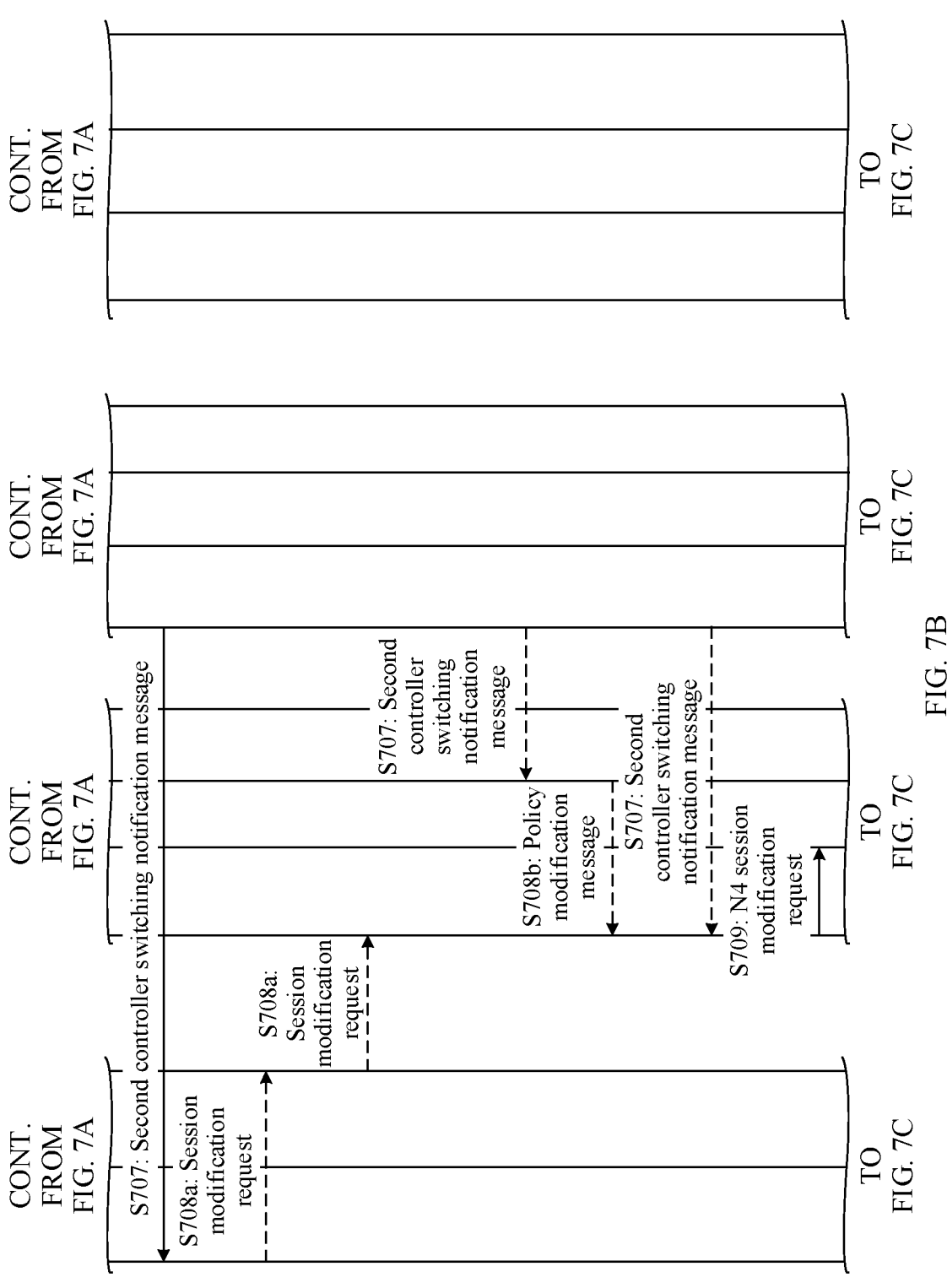
Figure 7C:
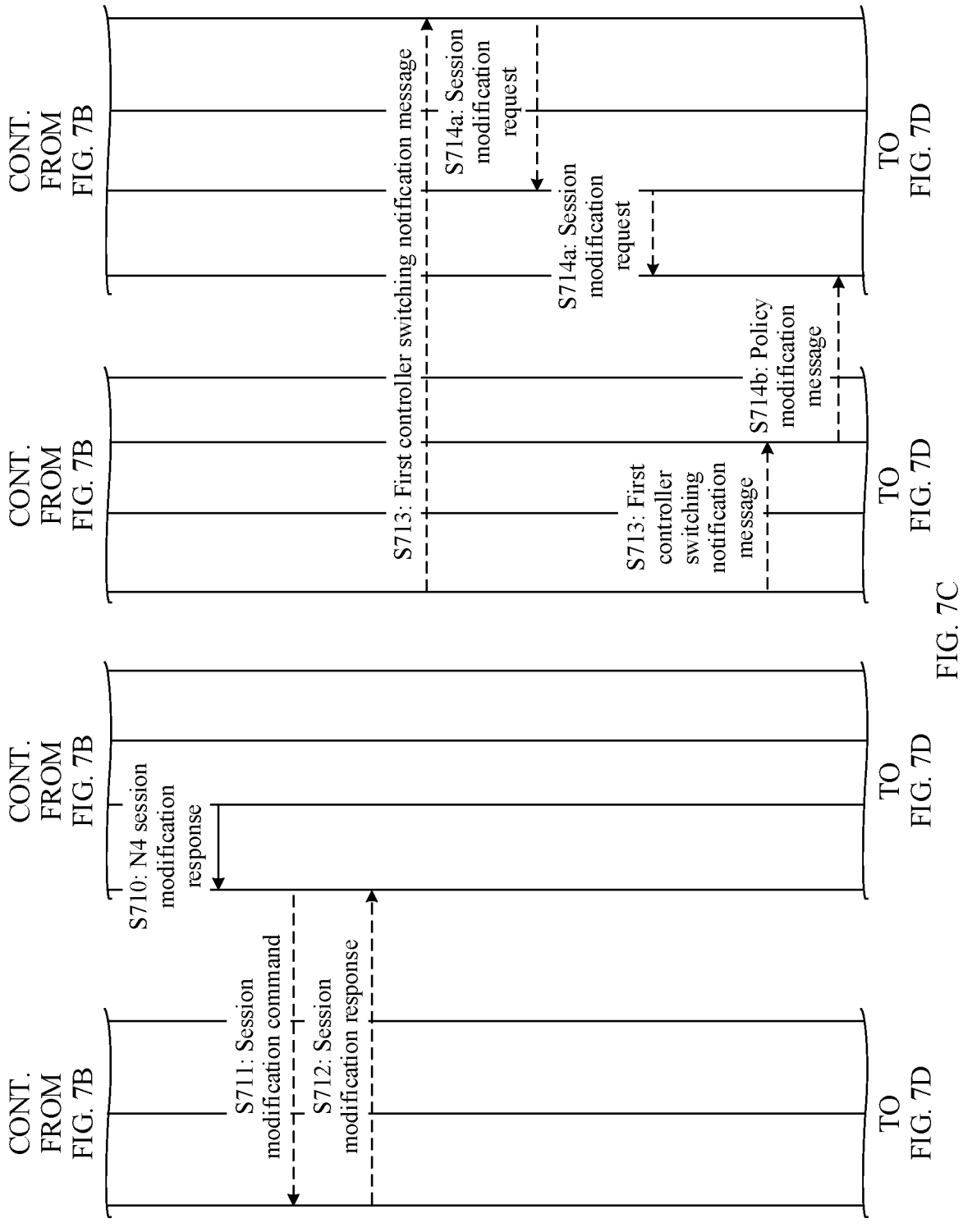
Figure 7D:
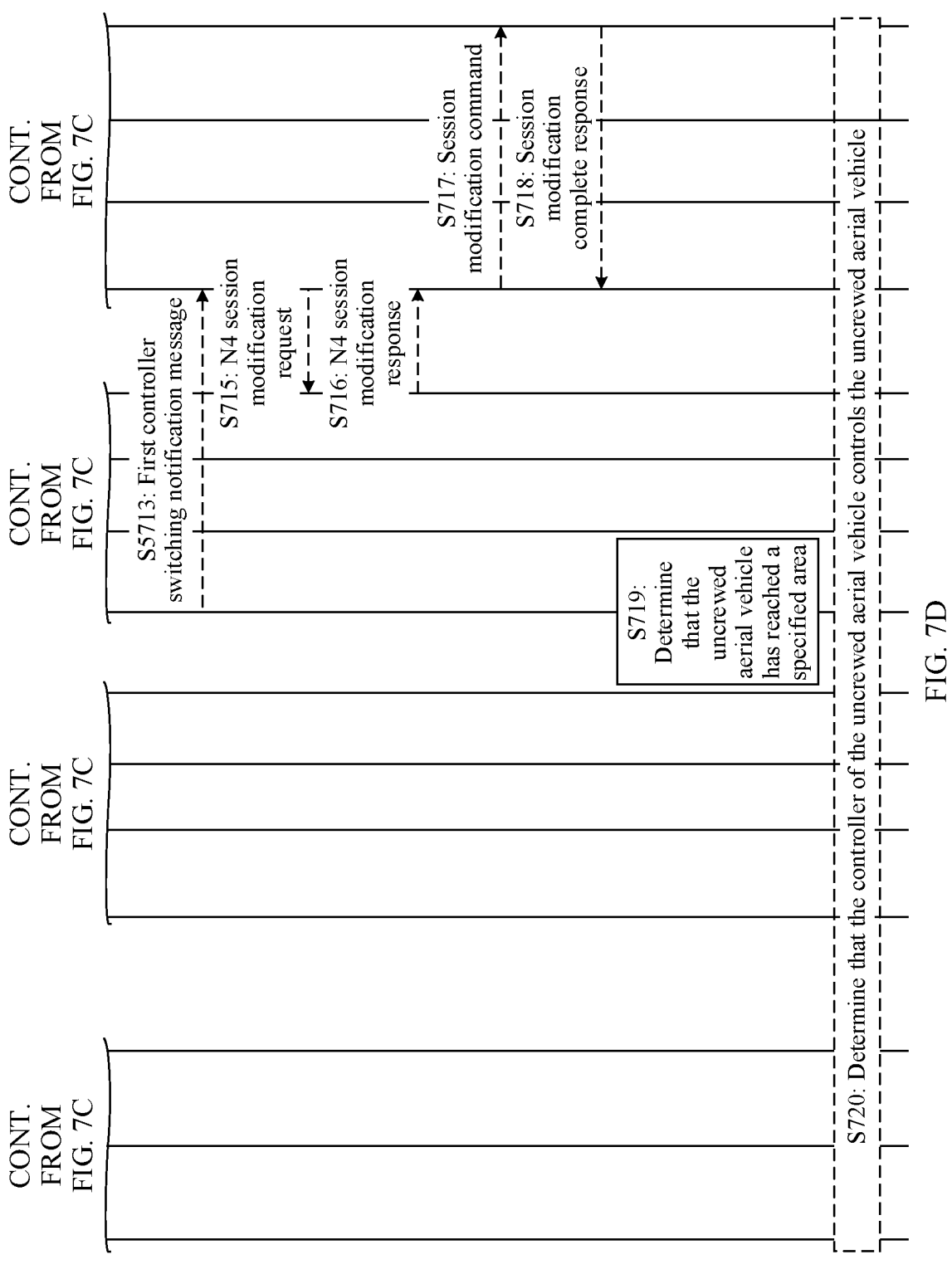

FIG. 6A to FIG. 6C are a schematic interaction diagram of another flight area management method for an uncrewed aerial vehicle according to an embodiment of this application. As shown in FIG. 6A to FIG. 6C, the flight area management method includes steps S601 to S617. The steps are as follows.

S601: A UTM sends a subscription request message to an AMF.

S602: The AMF sends a location reporting control message to an access network.

S603: The access network sends a location reporting message to the AMF.

S604: After obtaining flight area exception information of the uncrewed aerial vehicle, the AMF sends a subscription request response message to the UTM.

For implementations of steps S601 to S604, refer to implementations of steps S201 to S204. Details are not described herein again.

S605: The AMF sends a flight area exception notification message of the uncrewed aerial vehicle to an SMF.

The flight area exception notification message of the uncrewed aerial vehicle is used to notify that the uncrewed aerial vehicle is not located in a normal flight area and indicate the SMF to determine the UTM as a controller of the uncrewed aerial vehicle in a context of a session corresponding to both the uncrewed aerial vehicle and the controller of the uncrewed aerial vehicle.

There is no execution sequence between step S604 and step S605.

S606: The SMF sends an N4 session modification request to a UPF.

S607: The UPF sends an N4 session modification response to the SMF.

S608: The SMF sends a session modification command to the uncrewed aerial vehicle.

The session modification command may include a reason for session modification. For example, the reason may be that the uncrewed aerial vehicle leaves the normal flight area or the controller needs to be switched. Session modification may be understood as: determining the UTM as the controller of the uncrewed aerial vehicle or changing the session between the controller of the uncrewed aerial vehicle and the uncrewed aerial vehicle to a session between the uncrewed aerial vehicle and the UTM. For a manner of session modification, refer to a modification manner in the foregoing embodiment. Details are not described herein again.

S609: The uncrewed aerial vehicle sends a session modification response to the SMF.

For implementations of steps S608 and S609, refer to implementations of steps S214 and S215 in the foregoing embodiment. Details are not described herein again.

S610: The UTM sends a first controller switching notification message.

S611a: When the first controller switching message is sent to the controller of the uncrewed aerial vehicle, the controller of the uncrewed aerial vehicle sends a session modification request to a C-AMF, and the C-AMF sends the session modification request to a C-SMF.

S611b: When the first controller switching notification message is sent to a C-PCF, the C-PCF sends a policy modification message to the C-SMF.

S612: The C-SMF sends an N4 session modification request to a C-UPF.

S613: The C-UPF sends an N4 session modification response to the C-SMF.

S614: The C-SMF sends a session modification command to the controller of the uncrewed aerial vehicle.

S615: The controller of the uncrewed aerial vehicle sends a session modification complete response to the C-SMF.

S616: The UTM determines that the UAV has reached the normal flight area.

S617: The controller of the uncrewed aerial vehicle is determined to control the uncrewed aerial vehicle.

For implementations of steps S610 to S617, refer to implementations of steps S210 to S217 in the foregoing embodiment. Details are not described herein again.

In this example, when determining that the uncrewed aerial vehicle is not located in the normal flight area, the AMF directly sends the flight area exception notification message of the uncrewed aerial vehicle to the SMF. The SMF initiates, based on the flight area exception notification message of the uncrewed aerial vehicle, an action of modifying the controller of the uncrewed aerial vehicle, such that efficiency of modifying the controller of the uncrewed aerial vehicle can be improved, and the UTM can control the uncrewed aerial vehicle more quickly. This improves controlling safety and stability for the uncrewed aerial vehicle.

FIG. 7A to FIG. 7D are a schematic interaction diagram of another flight area management method for an uncrewed aerial vehicle according to an embodiment of this application. As shown in FIG. 7A to FIG. 7D, the flight area management method includes steps S701 to S717. The steps are as follows.

S701: A UTM sends a subscription request message to an AMF.

S702: The AMF sends a location reporting control message to an access network.

S703: The access network sends a location reporting message to the AMF.

S704: After obtaining flight area exception information of the uncrewed aerial vehicle, the AMF sends a subscription request response message to the UTM.

For implementations of steps S701 to S704, refer to implementations of steps S201 to S204. Details are not described herein again.

S705: The UTM sends a notification about the uncrewed aerial vehicle leaving a normal flight area to a controller of the uncrewed aerial vehicle.

The notification about the uncrewed aerial vehicle leaving the normal flight area includes third control indication information, where the third control indication information is used to notify that the uncrewed aerial vehicle leaves the normal flight area and indicate the controller of the uncrewed aerial vehicle to control the uncrewed aerial vehicle to enter the normal flight area.

The notification about the uncrewed aerial vehicle leaving the normal flight area further includes a specific area, where the specific area may be the normal flight area or may be another area in which the uncrewed aerial vehicle is allowed to fly.

After receiving the notification about the uncrewed aerial vehicle leaving the normal flight area, the controller of the uncrewed aerial vehicle controls the uncrewed aerial vehicle to enter the specific area.

The notification about the uncrewed aerial vehicle leaving the normal flight area further includes a time period, where the time period is the same as a time period of a started timer on the UTM side, and is used to indicate the controller of the uncrewed aerial vehicle to control, within the preset time period, the uncrewed aerial vehicle to enter the specific area.

S706: The UTM starts the timer, and after the timer expires, the UTM determines whether the uncrewed aerial vehicle has reached the designated area.

After starting the timer, if the UTM receives a notification message sent by the controller of the uncrewed aerial vehicle via the AMF within the time period, the UTM determines that the uncrewed aerial vehicle has reached the designated area; or if the UTM receives no notification message after the time period expires, the UTM determines that the uncrewed aerial vehicle has not reached the designated area.

Certainly, after the preset time period expires, the UTM may alternatively directly determine, based on a location message reported by the access network, whether the uncrewed aerial vehicle has entered the designated area.

S707: After determining that the uncrewed aerial vehicle has not reached the designated area, the UTM sends a second controller switching notification message.

After the UTM determines that the uncrewed aerial vehicle has not reached the designated area, subsequent steps S707 to S712 are performed in the following manner:

(1) If the second control message switching notification is sent to the uncrewed aerial vehicle, steps S708a, S709, and S710 are performed;

(2) If the second control message switching notification is sent to a PCF, steps S708*b*, S709, S710, S711, and S712 are performed; or (3) If the second control message switching notification is sent to an SMF, steps S709, S710, S711, and S712 are performed.

S708*a*: When the second controller switching notification message is sent to the uncrewed aerial vehicle, the uncrewed aerial vehicle sends a session modification request to the AMF, and the AMF forwards the session modification request to the SMF.

S708*b*: When the second controller switching notification message is sent to the PCF, the PCF sends a policy modification message to the SMF after receiving the second controller switching notification message.

S709: The SMF sends an N4 session modification request to a UPF.

After receiving the policy modification message, the SMF determines identification information of the UTM as identification information of the controller of the uncrewed aerial vehicle in session policy information corresponding to both the uncrewed aerial vehicle and the controller of the uncrewed aerial vehicle, to determine the UTM as the controller of the uncrewed aerial vehicle. The identification information herein may be understood as route forwarding information, an address of the UTM, or the like.

After determining the identification information of the UTM as the identification information of the controller of the uncrewed aerial vehicle in the session policy information corresponding to both the uncrewed aerial vehicle and the controller of the uncrewed aerial vehicle, the SMF sends the N4 session modification request to the UPF.

S710: The UPF sends an N4 session modification response to the SMF.

S711: The SMF sends a session modification command to the uncrewed aerial vehicle.

S712: The uncrewed aerial vehicle sends a session modification response to the SMF.

For implementations of steps S707 to S712, refer to implementations in the foregoing embodiment. Details are not described herein again.

S713: The UTM sends a first controller switching notification message.

S714*a*: When the first controller switching message is sent to the controller of the uncrewed aerial vehicle, the controller of the uncrewed aerial vehicle sends a session modification request to a C-AMF, and the C-AMF sends the session modification request to a C-SMF.

S714*b*: When the first controller switching notification message is sent to a C-PCF, the C-PCF sends a policy modification message to the C-SMF.

S715: The C-SMF sends an N4 session modification request to a C-UPF.

S716: The C-UPF sends an N4 session modification response to the C-SMF.

S717: The C-SMF sends a session modification command to the controller of the uncrewed aerial vehicle.

S718: The controller of the uncrewed aerial vehicle sends a session modification complete response to the C-SMF.

S719: The UTM determines that the UAV has reached the normal flight area.

S720: The controller of the uncrewed aerial vehicle is determined to control the uncrewed aerial vehicle.

For implementations of steps S713 to S720, refer to implementations of steps S210 to S217 in the foregoing embodiment. Details are not described herein again.

In this example, when determining that the uncrewed aerial vehicle is not located in the normal flight area, the UTM sends the notification about the uncrewed aerial vehicle leaving the normal flight area to the controller of the uncrewed aerial vehicle, to indicate the controller of the uncrewed aerial vehicle to control the uncrewed aerial vehicle to enter the normal flight area, and timing is started. If the notification message sent by the controller of the uncrewed aerial vehicle via the AMF is still not received after the time period expires, the controller of the uncrewed aerial vehicle is replaced with the UTM to control the uncrewed aerial vehicle, such that the controller of the uncrewed aerial vehicle is first notified to control the uncrewed aerial vehicle to enter the normal flight area without control switching. This can reduce a quantity of times of signaling interaction and save signaling resources.

The foregoing describes the flight area management methods for an uncrewed aerial vehicle provided in embodiments of this application. The following describes communication apparatuses provided in embodiments of this application.

Figure 8:
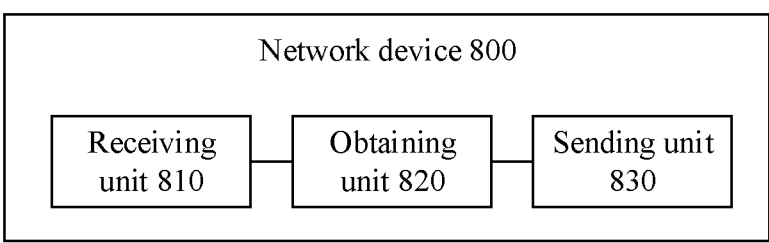
FIG. 8 is a schematic block diagram of a network device according to an embodiment of this application.

FIG. 8 is a schematic block diagram of a network device 800 according to an embodiment of this application. The network device 800 includes a receiving unit 810, an obtaining unit 820, and a sending unit 830.

The receiving unit 810 is configured to receive a subscription request message from a UTM, where the subscription request message is used to request to subscribe to a flight area change event of an uncrewed aerial vehicle.

The obtaining unit 820 is configured to obtain flight area exception information of the uncrewed aerial vehicle, where the flight area exception information indicates that the uncrewed aerial vehicle is not located in a normal flight area.

The sending unit 830 is configured to send a subscription request response message to the UTM, where the subscription request response message is used to indicate that the uncrewed aerial vehicle is not located in the normal flight area.

Optionally, in an embodiment, the sending unit 830 is further configured to: send a flight area exception notification message of the uncrewed aerial vehicle to a session management function SMF, where the flight area exception notification message of the uncrewed aerial vehicle is used to notify that the uncrewed aerial vehicle is not located in the normal flight area and indicate the SMF to determine the UTM as a controller of the uncrewed aerial vehicle in a context of a session corresponding to both the uncrewed aerial vehicle and the controller of the uncrewed aerial vehicle.

Optionally, in an embodiment, the sending unit 830 is further configured to: send a controller switching notification message to the uncrewed aerial vehicle, where the controller switching notification message is used to indicate that the UTM is determined as the controller of the uncrewed aerial vehicle.

Figure 9:
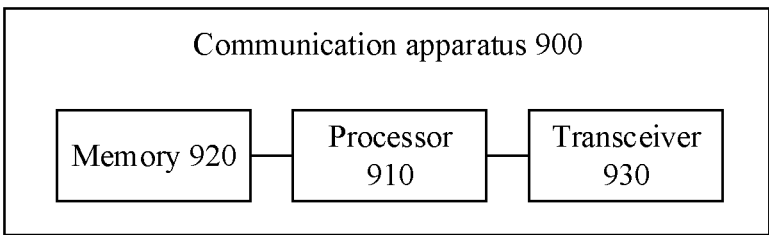
FIG. 9 is a schematic block diagram of a communication apparatus according to an embodiment of this application.

As shown in FIG. 9, an embodiment of this application further provides a communication apparatus 900. The communication apparatus 900 includes a processor 910, a memory 920, and a transceiver 930. The memory 920 stores instructions or a program. The processor 910 is configured to execute the instructions or the program stored in the memory 920. When the instructions or the program stored in the memory 920 are/is executed, the processor 910 is configured to perform an operation performed by the processing unit 820 in the foregoing embodiment, and the transceiver 930 is configured to perform an operation performed by the transceiver unit 810 in the foregoing embodiment.

It should be understood that the network device 800 or the communication apparatus 900 in embodiments of this application may correspond to the network device in the communication method in embodiments of this application, and operations and/or functions of modules in the network apparatus 800 or the communication apparatus 900 are separately configured to implement corresponding procedures of the methods in FIG. 2A to FIG. 2C to FIG. 7A to FIG. 7D. For brevity, details are not described herein again.

Figure 10:
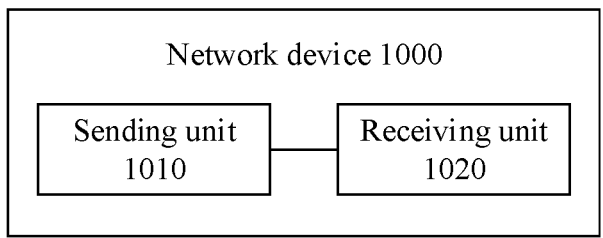
FIG. 10 is a schematic block diagram of a network device according to an embodiment of this application.

FIG. 10 is a schematic block diagram of a network device 1000 according to an embodiment of this application. The internet of things device 1000 includes a sending unit 1010 and a receiving unit 1020.

The sending unit 1010 is configured to send a subscription request message to an AMF, where the subscription request message is used to request to subscribe to a flight area change event of an uncrewed aerial vehicle.

The receiving unit 1020 is configured to receive a subscription request response message, where the subscription request response message is used to indicate that the uncrewed aerial vehicle is not located in a normal flight area.

The sending unit 1010 is configured to send a first controller switching notification message, where the first controller switching notification message includes first control indication information, and the first control indication information is used to indicate a controller of the uncrewed aerial vehicle to stop controlling the uncrewed aerial vehicle.

The sending unit 1020 is configured to send a second controller switching notification message, where the second controller switching notification message includes second control indication information, and the second control indication information is used to indicate that a UTM is determined as the controller of the uncrewed aerial vehicle.

Optionally, in an embodiment, the sending unit 1010 is configured to: send the first controller switching notification message to a PCF, an SMF, or the controller of the uncrewed aerial vehicle.

Optionally, in an embodiment, the sending unit 1010 is configured to: send the second controller switching notification message to the uncrewed aerial vehicle.

Optionally, in an embodiment, the second control indication information is used to indicate that identification information of the UTM is determined as the controller of the uncrewed aerial vehicle in session policy information corresponding to both the uncrewed aerial vehicle and the controller of the uncrewed aerial vehicle.

Optionally, in an embodiment, the second control indication information is used to indicate that identification information of the UTM is determined as the controller of the uncrewed aerial vehicle in a context of a session corresponding to both the uncrewed aerial vehicle and the controller of the uncrewed aerial vehicle.

Optionally, in an embodiment, before sending the first controller switching notification message, the sending unit 1010 is further configured to: send, by the UTM, a notification about the uncrewed aerial vehicle leaving the normal flight area to the controller of the uncrewed aerial vehicle, where the notification about the uncrewed aerial vehicle leaving the normal flight area includes control indication information, and the control indication information is used to indicate that the uncrewed aerial vehicle leaves the normal flight area and indicate the controller of the uncrewed aerial vehicle to control the uncrewed aerial vehicle to enter the normal flight area.

Optionally, in an embodiment, the sending unit 1010 is configured to: start a timer; and after the timer expires, send, by the sending unit, the first controller switching notification message if a notification message sent by the AMF is not received, where the notification message is used to notify the UTM that the uncrewed aerial vehicle has entered the normal flight area.

Optionally, in an embodiment, the control indication information included in the first controller switching message is used to indicate that the session between the uncrewed aerial vehicle and the controller of the uncrewed aerial vehicle is released, such that the controller of the uncrewed aerial vehicle stops controlling the uncrewed aerial vehicle.

Optionally, in an embodiment, the receiving unit 1020 is configured to receive a controller switching request sent by the uncrewed aerial vehicle.

The sending unit 1010 is configured to send a controller switching response to the uncrewed aerial vehicle, where the controller switching response is used to indicate that the UTM accepts a control request from the uncrewed aerial vehicle.

Figure 11:
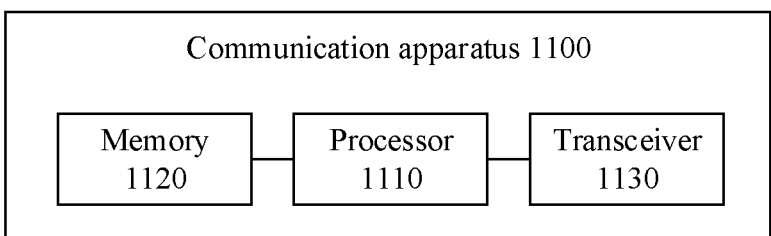
FIG. 11 is a schematic block diagram of another communication apparatus according to an embodiment of this application.

As shown in FIG. 11, an embodiment of this application further provides a communication apparatus 1100. The communication apparatus 1100 includes a processor 1110, a memory 1120, and a transceiver 1130. The memory 1120 stores instructions or a program. The processor 1110 is configured to execute the instructions or the program stored in the memory 1120. When the instructions or the program stored in the memory 1120 are/is executed, the processor 1110 is configured to perform an operation performed by the receiving unit 1020 in the foregoing embodiment, and the transceiver 1130 is configured to perform an operation performed by the sending unit 1010 and the receiving unit 1020 in the foregoing embodiment.

It should be understood that the network device 1000 or the communication apparatus 1100 in embodiments of this application may correspond to the network device in the communication method in embodiments of this application, and operations and/or functions of modules in the network device 1000 or the communication apparatus 1100 are separately configured to implement corresponding procedures of the methods in FIG. 2A to FIG. 2C to FIG. 7A to FIG. 7D. For brevity, details are not described herein again.

An embodiment of this application further provides a computer-readable storage medium. The computer-readable storage medium stores a computer program. When the program is executed by a processor, a procedure related to the communication apparatus in the flight area management method for an uncrewed aerial vehicle provided in the foregoing method embodiments may be implemented.

An embodiment of this application further provides a communication apparatus. The communication apparatus may be a terminal device or a circuit. The communication apparatus may be configured to perform an action performed by the network device in the foregoing method embodiments.

Figure 12:
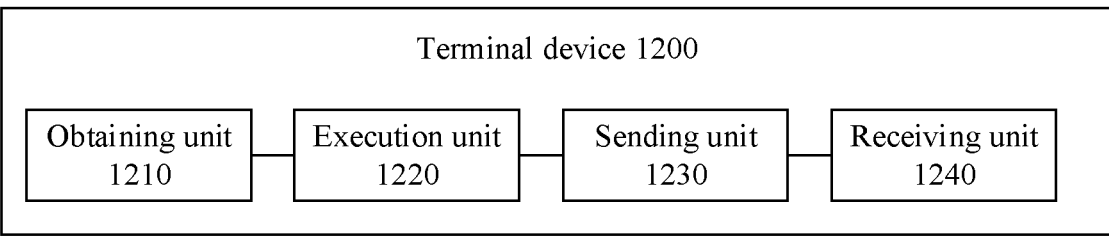
FIG. 12 is a schematic block diagram of a terminal device according to an embodiment of this application.

FIG. 12 is a schematic block diagram of a terminal device 1200 according to an embodiment of this application. The network apparatus 1200 includes an obtaining unit 1210 and an execution unit 1220.

The obtaining unit 1210 is configured to obtain control indication information of an uncrewed aerial vehicle when the uncrewed aerial vehicle is not located in a normal flight area, where the control indication information is used to indicate the terminal device to stop controlling the uncrewed aerial vehicle or to control the uncrewed aerial vehicle to enter the normal flight area.

The execution unit 1220 is configured to perform an operation indicated by the control indication information on the uncrewed aerial vehicle.

Optionally, in an embodiment, if the control indication information is used to indicate the terminal device to stop controlling the uncrewed aerial vehicle, the obtaining unit 1210 is configured to: obtain the control indication information from a first controller switching notification message received from a UTM.

Optionally, in an embodiment, the terminal device further includes a sending unit 1230 and a receiving unit 1240.

The sending unit 1230 is configured to send a session release request to a session management function SMF to request the SMF to release a session between the terminal device and the uncrewed aerial vehicle.

The receiving unit 1240 is configured to receive a session release response.

Optionally, in an embodiment, if the control indication information is used to indicate the terminal device to stop controlling the uncrewed aerial vehicle, the obtaining unit 1210 is configured to: obtain the control indication information from a received session modification command or a received session release command, where the session modification command or the session release command is sent by an SMF.

Optionally, in an embodiment, if the control indication information is used to indicate the terminal device to control the uncrewed aerial vehicle to enter the normal flight area, the obtaining unit 1210 is configured to: obtain the control indication information from a notification about the uncrewed aerial vehicle leaving the normal flight area that is received from the UTM.

Optionally, in an embodiment, the control indication information further includes a time period, and the execution unit 1220 includes: controlling, within the time period, the uncrewed aerial vehicle to enter the normal flight area.

Figure 13:
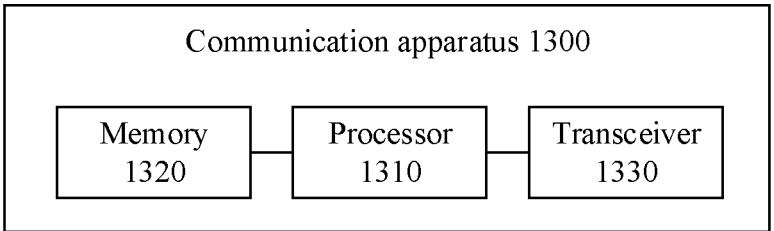
FIG. 13 is a schematic block diagram of a communication apparatus according to an embodiment of this application.

As shown in FIG. 13, an embodiment of this application further provides a communication apparatus 1300. The communication apparatus 1300 includes a processor 1310, a memory 1320, and a transceiver 1330. The memory 1320 stores instructions or a program. The processor 1310 is configured to execute the instructions or the program stored in the memory 1320. When the instructions or the program stored in the memory 1320 are/is executed, the processor 1310 is configured to perform an operation performed by the obtaining unit 1210 and the execution unit 1220 in the foregoing embodiment, and the transceiver 1330 is configured to perform an operation performed by the receiving unit 1230 and the sending unit 1240 in the foregoing embodiment.

It should be understood that the terminal device 1200 or the communication apparatus 1300 in embodiments of this application may correspond to the internet of things device in the communication method in embodiments of this application, and operations and/or functions of modules in the terminal device 1200 or the communication apparatus 1300 are separately configured to implement corresponding procedures of the methods in FIG. 2A to FIG. 2C to FIG. 7A to FIG. 7D. For brevity, details are not described herein again.

An embodiment of this application further provides a computer-readable storage medium. The computer-readable storage medium stores a computer program. When the program is executed by a processor, a procedure related to the communication apparatus in the flight area management method for an uncrewed aerial vehicle provided in the foregoing method embodiments may be implemented.

An embodiment of this application further provides a communication apparatus. The communication apparatus may be a terminal device or a circuit. The communication apparatus may be configured to perform an action performed by the terminal device in the foregoing method embodiments.

Figure 14:
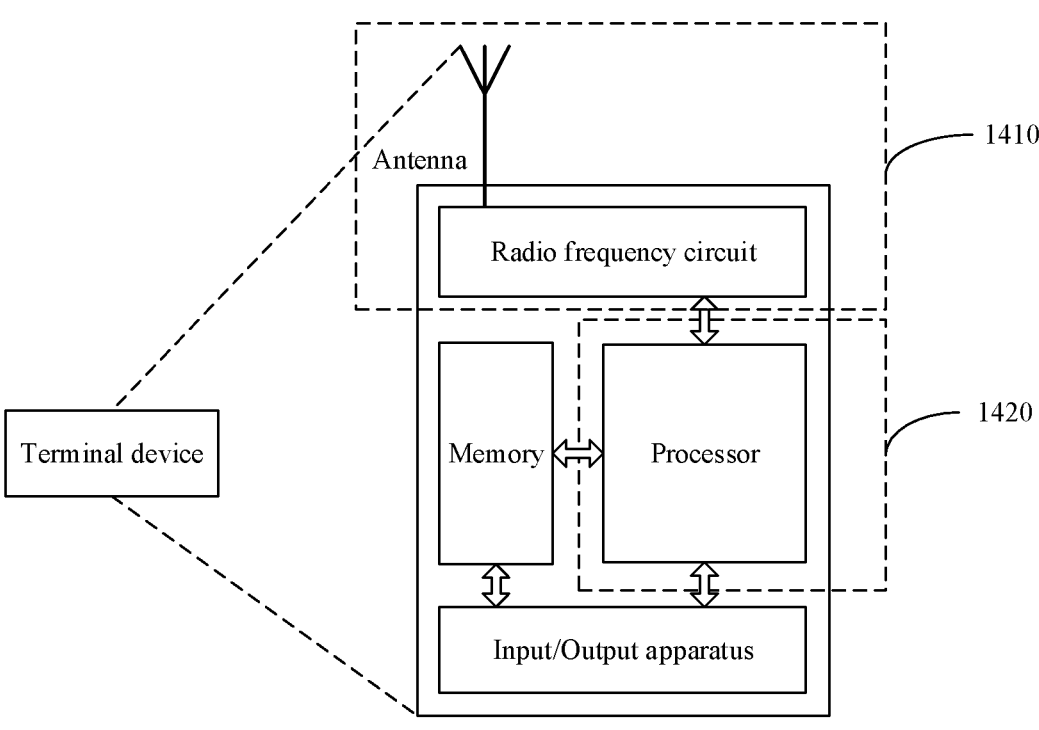
FIG. 14 is a schematic block diagram of a terminal device according to an embodiment of this application.

When the communication apparatus is a terminal device, FIG. 14 is a simplified schematic diagram of a structure of the terminal device. For ease of understanding and illustration, an example in which the terminal device is an uncrewed aerial vehicle is used in FIG. 14. As shown in FIG. 14, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and data. The radio frequency circuit is mainly configured to convert a baseband signal and a radio frequency signal and process the radio frequency signal. The antenna is mainly configured to send and receive a radio frequency signal in an electromagnetic wave form. The input/output apparatus such as a touchscreen, a display, or a keyboard is mainly configured to receive data input by a user and output data to the user. It should be noted that some types of terminal devices may have no input/output apparatus.

When data needs to be sent, the processor performs baseband processing on to-be-sent data, and then outputs the baseband signal to the radio frequency circuit. After performing radio frequency processing on the baseband signal, the radio frequency circuit sends the radio frequency signal to the outside via the antenna in an electromagnetic wave form. When data is sent to the terminal device, the radio frequency circuit receives the radio frequency signal via the antenna, converts the radio frequency signal into the baseband signal, and outputs the baseband signal to the processor. The processor converts the baseband signal into data, and processes the data. For ease of description, FIG. 14 shows only one memory and one processor. In an actual terminal device product, there may be one or more processors and one or more memories. The memory may also be referred to as a storage medium, a storage device, or the like. The memory may be disposed independently of the processor, or may be integrated with the processor. This is not limited in this embodiment of this application.

In this embodiment of this application, the antenna and the radio frequency circuit that have sending and receiving functions may be considered as a transceiver unit of the terminal device, and the processor that has a processing function may be considered as a processing unit of the terminal device. As shown in FIG. 14, the terminal device includes a transceiver unit 1410 and a processing unit 1420. The transceiver unit may also be referred to as a transceiver, a transceiver apparatus, or the like. The processing unit may also be referred to as a processor, a processing board, a processing module, a processing apparatus, or the like. Optionally, a component that is in the transceiver unit 1410 and that is configured to implement a receiving function may be considered as a receiving unit, and a component that is in the transceiver unit 1410 and that is configured to implement a sending function may be considered as a sending unit. In other words, the transceiver unit 1410 includes the receiving unit and the sending unit. The transceiver unit sometimes may also be referred to as a transceiver, a transceiver circuit, or the like. The receiving unit sometimes may also be referred to as a receiver, a receiver circuit, or the like. The sending unit sometimes may also be referred to as a transmitter, a transmitter circuit, or the like.

It should be understood that the transceiver unit 1410 is configured to perform a sending operation and a receiving operation on the terminal device side in the foregoing method embodiments, and the processing unit 1420 is configured to perform an operation other than the sending operation and the receiving operation of the terminal device in the foregoing method embodiments.

For example, in an implementation, the transceiver unit 1410 is configured to perform the receiving operation on the uncrewed aerial vehicle side in FIG. 2A to FIG. 2C, and/or the transceiver unit 1410 is further configured to perform other receiving and sending steps on the terminal device side in embodiments of this application. The processing unit 1420 is configured to perform step S206 in FIG. 2A to FIG. 2C, and/or the processing unit 1420 is further configured to perform another processing step on the terminal device side in embodiments of this application.

When the communication apparatus is a chip apparatus or a circuit, the apparatus may include a transceiver unit and a processing unit. The transceiver unit may be an input/output circuit and/or a communication interface. The processing unit is an integrated processor, a microprocessor, or an integrated circuit.

Figure 15:
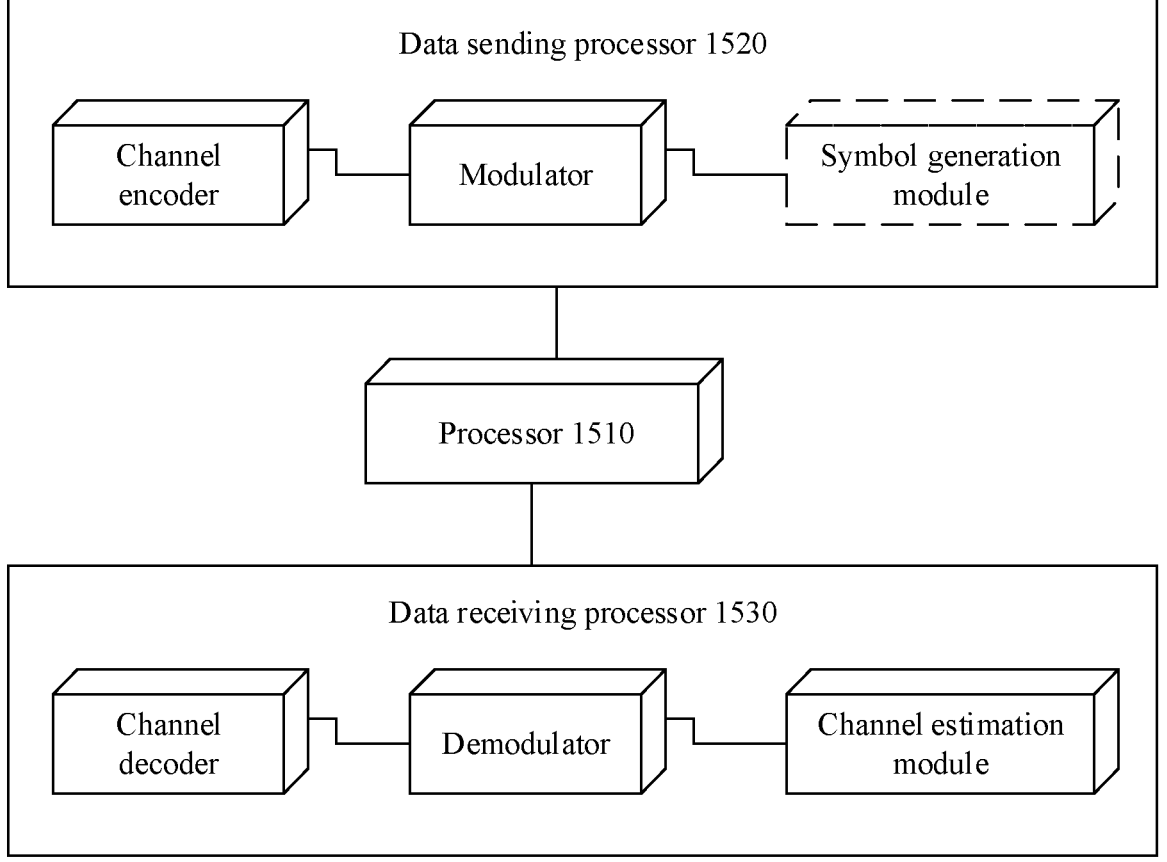
FIG. 15 is a schematic block diagram of another terminal device according to an embodiment of this application.

When the communication apparatus in this embodiment is a terminal device, refer to a terminal device shown in FIG. 15. As an example, the device may implement a function similar to that of the processor 1310 in FIG. 13. In FIG. 15, the terminal device includes a processor 1510, a data sending processor 1520, and a data receiving processor 1530. The data sending processor 1520 in FIG. 15 may be the sending unit 1230 in the foregoing embodiment. Although a channel encoder and a channel decoder are shown in FIG. 15, it may be understood that the modules are merely an example and do not constitute any limitation on this embodiment.

Figure 16:
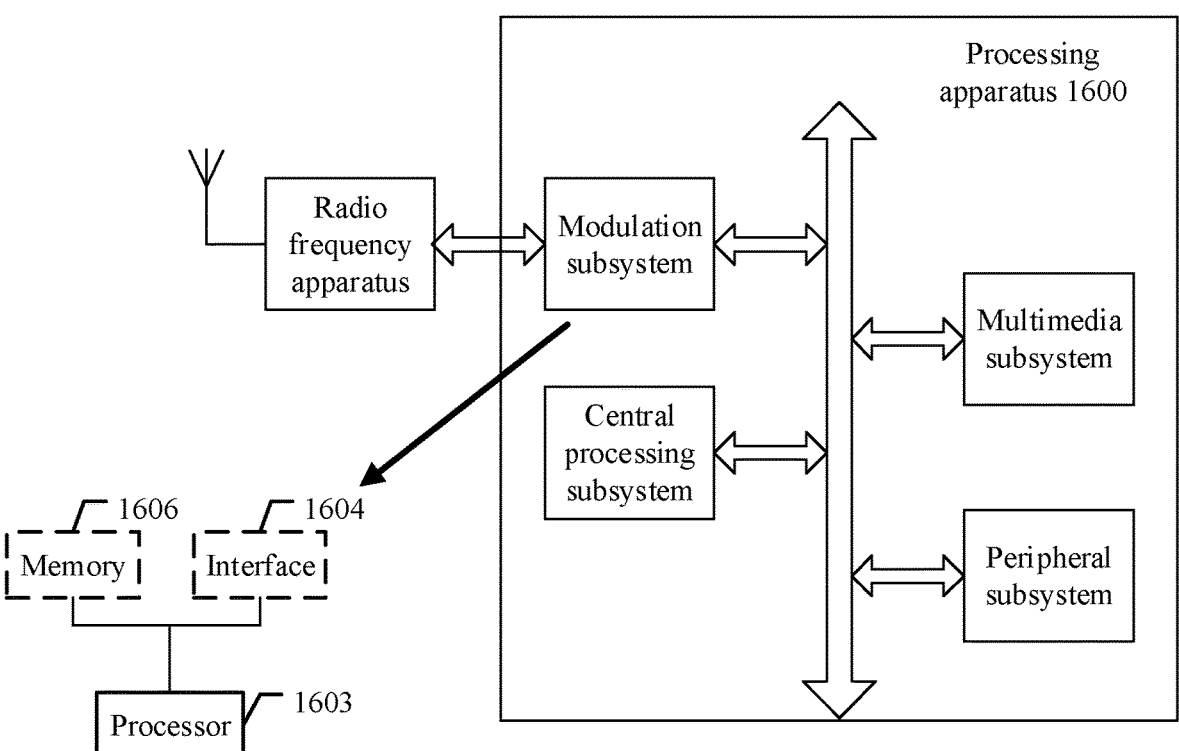
FIG. 16 is a schematic block diagram of another terminal device according to an embodiment of this application.

FIG. 16 shows another form of a terminal device in this embodiment. A processing apparatus 1600 includes modules such as a modulation subsystem, a central processing subsystem, and a peripheral subsystem. The communication apparatus in this embodiment may be used as the modulation subsystem. For example, the modulation subsystem may include a processor 1603 and an interface 1604. The processor 1603 may complete a function of the foregoing receiving unit 1240, and the interface 1604 may complete a function of the foregoing sending unit 1230. In another variation, the modulation subsystem includes a memory 1606, a processor 1603, and a program that is stored in the memory 1606 and that can be run on the processor. When executing the program, the processor 1603 implements the method on the terminal device side in the foregoing method embodiments. It should be noted that the memory 1606 may be non-volatile or volatile. The memory 1606 may be located in the modulation subsystem, or may be located in the processing apparatus 1600, provided that the memory 1606 can be connected to the processor 1603.

In another form of this embodiment, a computer-readable storage medium is provided. The computer-readable storage medium stores instructions. When the instructions are executed, the methods on the terminal device side in the foregoing method embodiments are performed.

In another form of this embodiment, a computer program product including instructions is provided. When the instructions are executed, the methods on the terminal device side in the foregoing method embodiments are performed.

Figure 17:
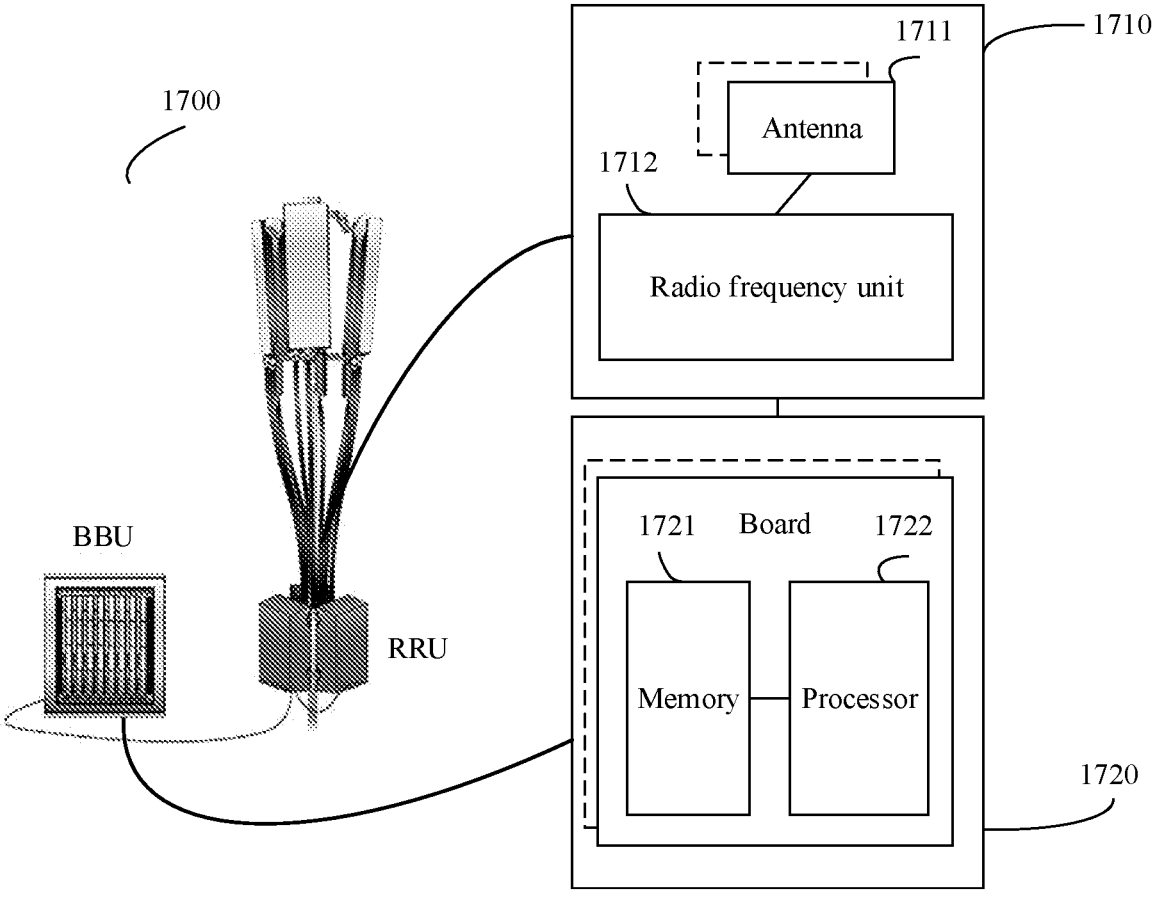
FIG. 17 is a schematic block diagram of a network apparatus according to an embodiment of this application.

When the apparatus in this embodiment is a network apparatus, the network apparatus may be shown in FIG. 17. A network apparatus 1700 includes one or more radio frequency units, for example, a remote radio unit (RRU) 1710 and one or more baseband units (BBUs) (which may also be referred to as a digital unit (DU)) 1720. The RRU 1710 may be referred to as a transceiver module, and corresponds to the receiving unit 810 and the sending unit 830 in FIG. 8. Optionally, the transceiver module may also be referred to as a transceiver, a transceiver circuit, or the like, and may include at least one antenna 1711 and a radio frequency unit 1712. The RRU 1710 is mainly configured to receive and send a radio frequency signal and perform conversion between the radio frequency signal and a baseband signal. For example, the RRU 1710 is configured to send indication information to a terminal device. The BBU 1710 is mainly configured to perform baseband processing, control a base station, and so on. The RRU 1710 and the BBU 1720 may be physically disposed together, or may be physically separated, namely, a distributed base station.

The BBU 1720 is a control center of the base station, and may also be referred to as a processing module. The BBU 1720 may correspond to the processing unit 820 in FIG. 8; and is mainly configured to complete baseband processing functions, such as channel coding, multiplexing, modulation, and spreading. For example, the BBU (processing module) may be configured to control the base station to perform an operation procedure related to the network apparatus in the foregoing method embodiments, for example, generate the foregoing indication information.

In an example, the BBU 1720 may include one or more boards, and a plurality of boards may jointly support a radio access network (such as a Long-Term Evolution (LTE) network) of a single access standard, or may separately support radio access networks (such as an LTE network, a 5G network, or another network) of different access standards. The BBU 1720 further includes a memory 1721 and a processor 1722. The memory 1721 is configured to store necessary instructions and necessary data. The processor 1722 is configured to control the base station to perform a necessary action, for example, control the base station to perform the operation procedure related to the network apparatus in the foregoing method embodiments. The memory 1721 and the processor 1722 may serve the one or more boards. In other words, the memory and the processor may be separately disposed on each board. Alternatively, the plurality of boards may share a same memory and processor. In addition, a necessary circuit may be further disposed on each board.

It should be understood that, the processor in embodiments of this application may be a central processing unit (CPU), or may be another general-purpose processor, a digital signal processor (DSP), an application-specific integrated circuit (ASIC), a field programmable gate array (FPGA), another programmable logic device, a transistor logic device, a discrete hardware component, or the like. The general-purpose processor may be a microprocessor, or the processor may be any conventional processor or the like.

In another form of this embodiment, a computer-readable storage medium is provided. The computer-readable storage medium stores instructions. When the instructions are executed, the methods on the network apparatus side in the foregoing method embodiments are performed.

In another form of this embodiment, a computer program product including instructions is provided. When the instructions are executed, the methods on the network apparatus side in the foregoing method embodiments are performed.

Figure 18:
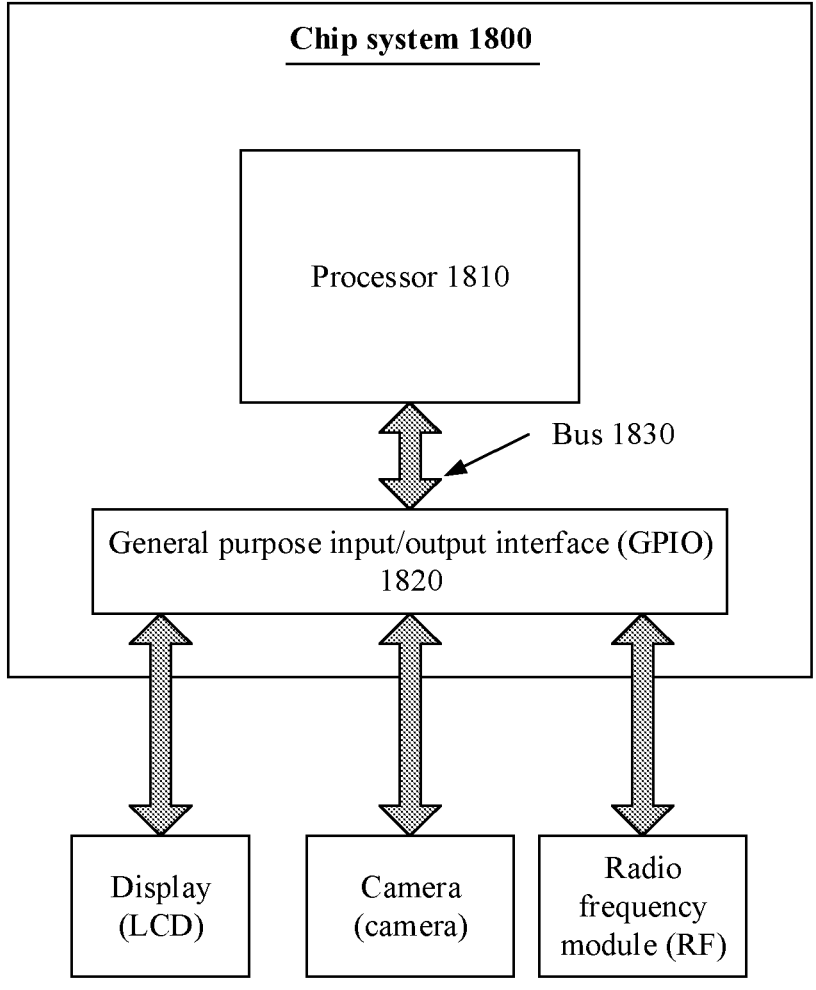
FIG. 18 is a schematic diagram of a structure of a chip system according to an embodiment of this application.

FIG. 18 is a schematic diagram of a structure of a chip system according to an embodiment of this application. As shown in FIG. 18, the chip system 1800 may include a processor 1810 and one or more interfaces 1820 coupled to the processor 1810. For example, the processor 1810 may be configured to read and execute computer-readable instructions. In an implementation, the processor 1810 may mainly include a controller, an arithmetic unit, and a register. For example, the controller is mainly responsible for decoding instructions, and sends a control signal for operations corresponding to the instructions. The arithmetic unit is mainly responsible for performing a fixed-point or floating-point arithmetic operation, a shift operation, a logic operation, and the like, or may perform an address operation and address conversion. The register is mainly responsible for saving a quantity of register operations, intermediate operation results, and the like that are temporarily stored during instruction execution. During implementation, a hardware architecture of the processor 1810 may be an application-specific integrated circuit (ASIC) architecture, a microprocessor without interlocked pipeline stages architecture (MIPS), an advanced reduced instruction set computing (RISC) machines (ARM) architecture, an NP architecture, or the like. The processor 1810 may be a single-core or multi-core processor.

For example, the interface 1820 may be configured to input to-be-processed data to the processor 1810, and may output a processing result of the processor 1810. During implementation, the interface 1820 may be a general purpose input/output (GPIO) interface, and may be connected to a plurality of peripheral devices (for example, a display such as a liquid-crystal display (LCD), a camera, and a radio frequency (RF) module). The interface 1820 is connected to the processor 1810 through a bus 1830.

In a possible implementation, the processor 1810 may be configured to invoke, from a memory, a program or data for implementation on the network apparatus side or the terminal device side in the flight area management method for an uncrewed aerial vehicle provided by one or more of embodiments of this application, such that the chip may implement the methods shown in FIG. 2A to FIG. 2C to FIG. 7A to FIG. 7D. The memory may be integrated with the processor 1810, or may be coupled to a communication chip 1800 through the interface 1820. In other words, the memory may be a part of the communication chip 1800, or may be independent of the communication chip 1800. The interface 1820 may be configured to output an execution result of the processor 1810. In this application, the interface 1820 may be configured to output a decoding result of the processor 1810. For the flight area management method for an uncrewed aerial vehicle provided in the one or more embodiments of this application, refer to the foregoing embodiments, and details are not described herein again.

It should be noted that a function corresponding to each of the processor 1810 and the interface 1820 may be implemented using a hardware design, a software design, or a combination of software and hardware. This is not limited herein.

It may be further understood that the memory in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM) used as an external cache. Through example but not limitative description, many forms of RAMs may be used, for example, a static random access memory (SRAM), a dynamic random-access memory (DRAM), a synchronous dynamic random-access memory (SDRAM), a double data rate (DDR) synchronous dynamic random-access memory (DDR SDRAM), an enhanced synchronous dynamic random-access memory (ESDRAM), a SynchLink dynamic random-access memory (SynchLink DRAM or SLDRAM), and a direct Rambus (DR) random-access memory (DR RAM).

It should be noted that when the processor is a general-purpose processor, a DSP, an ASIC, an FPGA, another programmable logic device, a transistor logic device, or a discrete hardware component, the memory (a storage module) is integrated into the processor.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

In at least one embodiment, a flight area management method for an uncrewed aerial vehicle is provided, wherein the method comprises: obtaining, by an AMF, flight area exception information of the uncrewed aerial vehicle, wherein the flight area exception information indicates that the uncrewed aerial vehicle is not located in a normal flight area; and sending, by the AMF, a flight area exception notification message to a UTM, wherein the flight area exception notification message is used to indicate that the uncrewed aerial vehicle is not located in the normal flight area.

In one or more aspects, the method further comprises: sending, by the AMF, the flight area exception notification message of the uncrewed aerial vehicle to a session management function SMF, wherein the flight area exception notification message of the uncrewed aerial vehicle is used to notify that the uncrewed aerial vehicle is not located in the normal flight area and indicate the SMF to determine the UTM as a controller of the uncrewed aerial vehicle in a context of a session corresponding to both the uncrewed aerial vehicle and the controller of the uncrewed aerial vehicle.

In one or more aspects, the method further comprises: sending, by the AMF, a controller switching notification message to the uncrewed aerial vehicle, wherein the controller switching notification message is used to indicate that the UTM is determined as the controller of the uncrewed aerial vehicle.

In at least one embodiment, a flight area management method for an uncrewed aerial vehicle is provided, where the method comprises: receiving, by a UTM, a flight area exception notification message, wherein the flight area exception notification message is used to indicate that the uncrewed aerial vehicle is not located in the normal flight area; sending, by the UTM, a first controller switching notification message, wherein the first controller switching notification message comprises first control indication information, and wherein the first control indication information is used to indicate a controller of the uncrewed aerial vehicle to stop controlling the uncrewed aerial vehicle; and sending, by the UTM, a second controller switching notification message, wherein the second controller switching notification message comprises second control indication information, and wherein the second control indication information is used to indicate that the UTM is determined as the controller of the uncrewed aerial vehicle.

In one or more aspects, the second control indication information is used to indicate that the UTM is determined as the controller of the uncrewed aerial vehicle in session policy information corresponding to both the uncrewed aerial vehicle and the controller of the uncrewed aerial vehicle.

In one or more aspects, the second control indication information is used to indicate that the UTM is determined as the controller of the uncrewed aerial vehicle in a context of a session corresponding to both the uncrewed aerial vehicle and the controller of the uncrewed aerial vehicle.

In one or more aspects, before the sending, by the UTM, a first controller switching notification message, the method further comprises: sending, by the UTM, a notification about the uncrewed aerial vehicle leaving the normal flight area to the controller of the uncrewed aerial vehicle, wherein the notification about the uncrewed aerial vehicle leaving the normal flight area comprises third control indication information, and wherein the third control indication information is used to indicate that the uncrewed aerial vehicle leaves the normal flight area and indicate the controller of the uncrewed aerial vehicle to control the uncrewed aerial vehicle to enter the normal flight area.

In one or more aspects, the sending, by the UTM, a first controller switching notification message comprises: starting, by the UTM, a timer; and after the timer expires, sending, by the UTM, the first controller switching notification message if the UTM does not receive a notification message sent by the AMF, wherein the notification message is used to notify the UTM that the uncrewed aerial vehicle has entered the normal flight area.

In one or more aspects, the first control indication information is used to indicate to release a session between the uncrewed aerial vehicle and the controller of the uncrewed aerial vehicle, such that the controller of the uncrewed aerial vehicle stops controlling the uncrewed aerial vehicle.

In one or more aspects, the method further comprises: receiving, by the UTM, a controller switching request sent by the uncrewed aerial vehicle; and sending, by the UTM, a controller switching response to the uncrewed aerial vehicle, wherein the controller switching response is used to indicate that the UTM accepts a control request from the uncrewed aerial vehicle.

In at least one embodiment, a flight area management method for an uncrewed aerial vehicle is provided, wherein the method comprises: when the uncrewed aerial vehicle is not located in a normal flight area, obtaining, by a controller of the uncrewed aerial vehicle, control indication information of the uncrewed aerial vehicle, wherein the control indication information is used to indicate the controller of the uncrewed aerial vehicle to stop controlling the uncrewed aerial vehicle or to control the uncrewed aerial vehicle to enter the normal flight area; and performing, by the controller of the uncrewed aerial vehicle, an operation indicated by the control indication information on the uncrewed aerial vehicle.

In one or more aspects, if the control indication information is used to indicate the controller of the uncrewed aerial vehicle to stop controlling the uncrewed aerial vehicle, the obtaining, by a controller of the uncrewed aerial vehicle, control indication information of the uncrewed aerial vehicle comprises: obtaining, by the controller of the uncrewed aerial vehicle, the control indication information from a first controller switching notification message received from a UTM.

In one or more aspects, the method further comprises: sending, by the controller of the uncrewed aerial vehicle, a session release request to a session management function SMF, wherein the session release request is used to request the SMF to release a session between the controller of the uncrewed aerial vehicle and the uncrewed aerial vehicle; and receiving, by the controller of the uncrewed aerial vehicle, a session release response.

In one or more aspects, if the control indication information is used to indicate the controller of the uncrewed aerial vehicle to stop controlling the uncrewed aerial vehicle, the obtaining, by a controller of the uncrewed aerial vehicle, control indication information of the uncrewed aerial vehicle comprises: obtaining, by the controller of the uncrewed aerial vehicle, the control indication information from a received session modification command or a received session release command, wherein the session modification command or the session release command is sent by an SMF.

In one or more aspects, if the control indication information is used to indicate the controller of the uncrewed aerial vehicle to control the uncrewed aerial vehicle to enter the normal flight area, the obtaining, by a controller of the uncrewed aerial vehicle, control indication information of the uncrewed aerial vehicle comprises: obtaining, by the controller of the uncrewed aerial vehicle, the control indication information from a notification about the uncrewed aerial vehicle leaving the normal flight area that is received from the UTM.

In one or more aspects, if the control indication information further comprises a time period, the performing, by the controller of the uncrewed aerial vehicle, an operation indicated by the control indication information on the uncrewed aerial vehicle comprises: controlling, by the controller of the uncrewed aerial vehicle within the time period, the uncrewed aerial vehicle to enter the normal flight area.

In at least one embodiment, a network device is provided, wherein the device comprises: an obtaining unit configured to obtain flight area exception information of the uncrewed aerial vehicle, wherein the flight area exception information indicates that the uncrewed aerial vehicle is not located in a normal flight area; and a sending unit configured to send a flight area exception notification message to the UTM, wherein the flight area exception notification message is used to indicate that the uncrewed aerial vehicle is not located in the normal flight area.

In one or more aspects, the sending unit is further configured to: send the flight area exception notification message of the uncrewed aerial vehicle to a session management function SMF, wherein the flight area exception notification message of the uncrewed aerial vehicle is used to notify that the uncrewed aerial vehicle is not located in the normal flight area and indicate the SMF to determine the UTM as a controller of the uncrewed aerial vehicle in a context of a session corresponding to both the uncrewed aerial vehicle and the controller of the uncrewed aerial vehicle.

In one or more aspects, the sending unit is further configured to: send a controller switching notification message to the uncrewed aerial vehicle, wherein the controller switching notification message is used to indicate that the UTM is determined as the controller of the uncrewed aerial vehicle.

In at least one embodiment, a network device is provided, wherein the device comprises: a receiving unit configured to receive a flight area exception notification message, wherein the flight area exception notification message is used to indicate that the uncrewed aerial vehicle is not located in a normal flight area; and a sending unit configured to send a first controller switching notification message, wherein the first controller switching notification message comprises first control indication information, and the first control indication information is used to indicate a controller of the uncrewed aerial vehicle to stop controlling the uncrewed aerial vehicle, wherein the sending unit is configured to send a second controller switching notification message, wherein the second controller switching notification message comprises second control indication information, and the second control indication information is used to indicate that the UTM is determined as the controller of the uncrewed aerial vehicle.

In one or more aspects, the second control indication information is used to indicate that the UTM is determined as the controller of the uncrewed aerial vehicle in session policy information corresponding to both the uncrewed aerial vehicle and the controller of the uncrewed aerial vehicle.

In one or more aspects, the second control indication information is used to indicate that the UTM is determined as the controller of the uncrewed aerial vehicle in a context of a session corresponding to both the uncrewed aerial vehicle and the controller of the uncrewed aerial vehicle.

In one or more aspects, before sending the first controller switching notification message, the sending unit is further configured to: send, by the UTM, a notification about the uncrewed aerial vehicle leaving the normal flight area to the controller of the uncrewed aerial vehicle, wherein the notification about the uncrewed aerial vehicle leaving the normal flight area comprises third control indication information, and wherein the third control indication information is used to indicate that the uncrewed aerial vehicle leaves the normal flight area and indicate the controller of the uncrewed aerial vehicle to control the uncrewed aerial vehicle to enter the normal flight area.

In one or more aspects, before sending the first controller switching notification message, the sending unit is configured to: start a timer; and after the timer expires, send, by the sending unit, the first controller switching notification message if a notification message sent by an AMF is not received, wherein the notification message is used to notify the UTM that the uncrewed aerial vehicle has entered the normal flight area.

In one or more aspects, the control indication information comprised in the first controller switching message is used to indicate to release a session between the uncrewed aerial vehicle and the controller of the uncrewed aerial vehicle, such that the controller of the uncrewed aerial vehicle stops controlling the uncrewed aerial vehicle.

In one or more aspects, the receiving unit is configured to receive a controller switching request sent by the uncrewed aerial vehicle; and the sending unit is configured to send a controller switching response to the uncrewed aerial vehicle, wherein the controller switching response is used to indicate that the UTM accepts a control request from the uncrewed aerial vehicle.

In at least one embodiment, a terminal device is provided, where the device comprises: an obtaining unit configured to obtain control indication information of an uncrewed aerial vehicle when the uncrewed aerial vehicle is not located in a normal flight area, where the control indication information is used to indicate the terminal device to stop controlling the uncrewed aerial vehicle or to control the uncrewed aerial vehicle to enter the normal flight area; and an execution unit configured to perform an operation indicated by the control indication information on the uncrewed aerial vehicle.

In one or more aspects, if the control indication information is used to indicate the terminal device to stop controlling the uncrewed aerial vehicle, the obtaining unit is configured to: obtain the control indication information from a first controller switching notification message received from a UTM.

In one or more aspects, the terminal device further comprises a sending unit and a receiving unit, wherein the sending unit is configured to send a session release request to a session management function SMF to request the SMF to release a session between the terminal device and the uncrewed aerial vehicle; and the receiving unit is configured to receive a session release response.

In one or more aspects, if the control indication information is used to indicate the terminal device to stop controlling the uncrewed aerial vehicle, the obtaining unit is configured to: obtain the control indication information from a received session modification command or a received session release command, wherein the session modification command or the session release command is sent by an SMF.

In one or more aspects, if the control indication information is used to indicate the terminal device to control the uncrewed aerial vehicle to enter the normal flight area, the obtaining unit is configured to: obtain the control indication information from a notification about the uncrewed aerial vehicle leaving the normal flight area that is received from the UTM.

In one or more aspects, the control indication information further comprises a time period, and the execution unit comprises: controlling, within the time period, the uncrewed aerial vehicle to enter the normal flight area.

In at least one embodiment, a communication system is provided, wherein the communication system comprises the network device according to any one or more aspects disclosed herein and/or the terminal device according to any one or more aspects disclosed herein.

In at least one embodiment, a computer-readable storage medium is provided, where the computer-readable storage medium stores a computer program, and the computer program comprises program instructions; and when the program instructions are executed by a processor, the processor is enabled to perform the method according to any one or more aspects disclosed herein.

In the foregoing embodiments, description of embodiments has respective focuses. For a part that is not described in detail in an embodiment, refer to related description in other embodiments.

In the several embodiments provided in this application, it should be understood that the disclosed apparatus may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable memory. Based on such an understanding, the technical solutions of the present disclosure essentially, or the part contributing to other approaches, or all or a part of the technical solutions may be implemented in the form of a software product. The computer software product is stored in a memory and includes several instructions for instructing a computer device (which may be a personal computer, a server, a network device, or the like) to perform all or a part of the steps of the methods described in embodiments of the present disclosure. The foregoing memory includes any medium that can store program code, for example, a Universal Serial Bus (USB) flash drive, a read-only memory (ROM), a RAM, a removable hard disk, a magnetic disk, or an optical disc.

A person of ordinary skill in the art may understand that all or a part of the steps of the methods in embodiments may be implemented by a program instructing related hardware. The program may be stored in a computer-readable memory. The memory may include a flash memory, a read-only memory (ROM), a RAM, a magnetic disk, an optical disc, or the like.

What is claimed is:

1. A method comprising:
   receiving, by an unmanned aircraft system traffic management (UTM), a flight area exception notification message, wherein the flight area exception notification message indicates that an uncrewed aerial vehicle is not located in a normal flight area;
   sending, by the UTM in response to the flight area exception notification message, a first controller switching notification message, wherein the first controller switching notification message comprises first control indication information, and wherein the first control indication information instructs a controller of the uncrewed aerial vehicle to stop controlling the uncrewed aerial vehicle;
   sending, by the UTM, a second controller switching notification message, wherein the second controller switching notification message comprises second control indication information, and wherein the second control indication information indicates that the UTM is the controller of the uncrewed aerial vehicle based on session policy information corresponding to both the uncrewed aerial vehicle and the controller of the uncrewed aerial vehicle;
   receiving, by the UTM, a controller switching request from the uncrewed aerial vehicle; and
   sending, by the UTM, a controller switching response to the uncrewed aerial vehicle, wherein the controller switching response indicates that the UTM accepts the controller switching request.

2. The method of claim 1, wherein the session policy information comprises route forwarding information.

3. The method of claim 1, wherein the second control indication information indicates that the UTM is the controller of the uncrewed aerial vehicle in a context of a session corresponding to both the uncrewed aerial vehicle and the controller of the uncrewed aerial vehicle.

4. The method of claim 1, wherein before sending the first controller switching notification message, the flight area management method further comprises sending, by the UTM, a notification about the uncrewed aerial vehicle leaving the normal flight area to the controller of the uncrewed aerial vehicle, wherein the notification comprises third control indication information, wherein the third control indication information indicates that the uncrewed aerial vehicle has left the normal flight area, and wherein the third control indication information instructs the controller to control the uncrewed aerial vehicle to enter the normal flight area.

5. The method of claim 4, wherein sending the first controller switching notification message comprises:
   starting, by the UTM, a timer; and
   sending, after the timer expires, the first controller switching notification message responsive to determining that the UTM does not receive a notification message from an access and mobility management function (AMF) before the timer expires, wherein the notification message notifies the UTM that the uncrewed aerial vehicle has entered the normal flight area.

6. The method of claim 1, wherein the first control indication information indicates to release a session between the uncrewed aerial vehicle and the controller of the uncrewed aerial vehicle such that the controller stops controlling the uncrewed aerial vehicle.

7. The method of claim 1, further comprising sending, by the UTM, a subscription request message to an access and mobility management function (AMF).

8. The method of claim 7, wherein the subscription request message requests to subscribe to a flight area change event of the uncrewed aerial vehicle.

9. The method of claim 8, further comprising subscribing, by the UTM, to the flight area change event of the uncrewed aerial vehicle from the AMF.

10. The method of claim 8, wherein the subscription request message comprises identification information of the uncrewed aerial vehicle and normal flight area of the uncrewed aerial vehicle.

11. The method of claim 1, further comprising receiving, from an access and mobility management function (AMF), the flight area exception notification message.

12. The method of claim 1, further comprising sending the first controller switching notification message to a policy control function (PCF).

13. The method of claim 1, further comprising sending the first controller switching notification message to a session management function (SMF).

14. The method of claim 1, further comprising sending the first controller switching notification message to the controller of the uncrewed aerial vehicle.

15. A method comprising:
   obtaining, via a session modification command or a session release command from a session management function (SMF) and by a controller of an uncrewed aerial vehicle message responsive to determining that the uncrewed aerial vehicle is not located in a normal flight area, control indication information of the uncrewed aerial vehicle, wherein the control indication information instructs the controller to stop controlling the uncrewed aerial vehicle; and performing, by the controller, an operation indicated by the control indication information on the uncrewed aerial vehicle.

16. The method of claim 15, wherein message responsive to determining that the control indication information instructs the controller to stop controlling the uncrewed aerial vehicle, obtaining the control indication information comprises:

receiving, by the controller, a first controller switching notification message received from an unmanned aircraft system traffic management (UTM), wherein the first controller switching notification message comprises the control indication information; and obtaining, by the controller, the control indication information from the first controller switching notification message.

17. The method of claim 16, further comprising:

sending, by the controller, a session release request to the SMF, wherein the session release request requests the SMF to release a session between the controller and the uncrewed aerial vehicle; and receiving, by the controller of the uncrewed aerial vehicle, a session release response.

18. A terminal device, comprising:

a memory configured to store instructions; and a processor coupled to the memory and configured to execute the instructions to cause the terminal device to:

obtain, via a session modification command or a session release command from a session management function (SMF), control indication information of an uncrewed aerial vehicle responsive to determining that the uncrewed aerial vehicle is not located in a normal flight area, wherein the control indication information instructs the terminal device to stop controlling the uncrewed aerial vehicle; and perform an operation indicated by the control indication information on the uncrewed aerial vehicle.

19. The terminal device of claim 18, wherein message responsive to determining that the control indication information instructs the terminal device to stop controlling the uncrewed aerial vehicle, the processor is further configured to execute the instructions to cause the terminal device to obtain the control indication information from a first controller switching notification message received from an unmanned aircraft system traffic management (UTM).

20. The terminal device of claim 19, further comprising a transceiver configured to:

send a session release request to the SMF to request the SMF to release a session between the terminal device and the uncrewed aerial vehicle; and receive a session release response.

* * * * *